United States Patent
Iqbal et al.

(10) Patent No.: US 8,785,058 B2
(45) Date of Patent: Jul. 22, 2014

(54) INTEGRATED BIOFUEL CELL WITH ALIGNED NANOTUBE ELECTRODES AND METHOD OF USE THEREOF

(75) Inventors: Zafar Iqbal, Morristown, NJ (US); Yubing Wang, Piscataway, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1098 days.

(21) Appl. No.: 11/784,085

(22) Filed: Apr. 5, 2007

(65) Prior Publication Data

US 2008/0160384 A1    Jul. 3, 2008

Related U.S. Application Data

(60) Provisional application No. 60/790,333, filed on Apr. 7, 2006.

(51) Int. Cl.
| | |
|---|---|
| *H01M 8/16* | (2006.01) |
| *H01M 4/90* | (2006.01) |
| *H01M 4/86* | (2006.01) |
| *H01M 4/88* | (2006.01) |

(52) U.S. Cl.
CPC ............ *H01M 4/8803* (2013.01); *Y02E 60/527* (2013.01); *H01M 8/16* (2013.01); *H01M 4/90* (2013.01); *H01M 4/9083* (2013.01); *H01M 4/8647* (2013.01)
USPC .......................................................... 429/401

(58) Field of Classification Search
CPC ............................... H01M 8/16; Y02E 60/527
USPC .......................................... 429/2, 43, 46, 401
See application file for complete search history.

(56) References Cited

U.S. PATENT DOCUMENTS

| | | |
|---|---|---|
| 6,515,325 B1 | 2/2003 | Farnworth et al. |
| 6,566,704 B2 | 5/2003 | Choi et al. |
| 6,616,497 B1 | 9/2003 | Choi et al. |

(Continued)

FOREIGN PATENT DOCUMENTS

| | | |
|---|---|---|
| JP | 2001312953 | 11/2001 |
| JP | 2006111498 | 4/2006 |
| WO | WO 03/081687 | 10/2003 |

OTHER PUBLICATIONS

Gedye et al., The Use of Microwave Ovens for Rapid. Organic Synthesis, Tetrahedron Letters, vol. 27, No. 3, pp. 279-282 (1986).

(Continued)

*Primary Examiner* — Milton I Cano
*Assistant Examiner* — Stephen Yanchuk
(74) *Attorney, Agent, or Firm* — McCarter & English, LLP

(57) ABSTRACT

The present disclosure provides for a method of forming, producing or manufacturing functionalized and soluble nanomaterials, most specifically carbon nanotubes on a substrate, which can be used in the production or manufacture of biofuel cells. One embodiment provides for the coupling of biofuel cells with a nanomaterial, wherein the nanomaterial supports catalytic enzymes. Another embodiment provides for a biofuel cell which uses enzymes immobilized on nanomaterials as electrodes. Another embodiment provides for the construction of a biofuel cell, wherein the application of a microwave process, and/or an electrochemical technique, is used to develop a biofuel cell having nanomaterial/enzyme-based electrodes on a substrate. Another embodiment provides for a composite of nanomaterial grown on a substrate, coupled to tethered or bonded enzymes, which makes it possible to fabricate direct electron transfer electrodes. A method for producing a nanomaterial-substrate system is also disclosed.

49 Claims, 18 Drawing Sheets

(56) References Cited

U.S. PATENT DOCUMENTS

| | | | |
|---|---|---|---|
| 6,830,981 | B2 | 12/2004 | Lee et al. |
| 6,838,297 | B2 | 1/2005 | Iwasaki et al. |
| 6,858,891 | B2 | 2/2005 | Farnworth et al. |
| 6,933,222 | B2 | 8/2005 | Dubin et al. |
| 6,995,046 | B2 | 2/2006 | Rueckes et al. |
| 7,045,421 | B2 | 5/2006 | Rueckes et al. |
| 7,081,385 | B2 | 7/2006 | Farnworth et al. |
| 7,091,096 | B2 | 8/2006 | Balasubramanian et al. |
| 7,132,714 | B2 | 11/2006 | Bae et al. |
| 7,135,773 | B2 | 11/2006 | Furukawa et al. |
| 7,211,844 | B2 | 5/2007 | Furukawa et al. |
| 7,652,418 | B2 | 1/2010 | Choi et al. |
| 2005/0095466 | A1* | 5/2005 | Minteer et al. ............ 429/12 |
| 2005/0118494 | A1* | 6/2005 | Choi ........................ 429/43 |
| 2005/0156203 | A1 | 7/2005 | Bae et al. |
| 2006/0154126 | A1* | 7/2006 | Ritts et al. ............... 429/29 |
| 2006/0169972 | A1 | 8/2006 | Furukawa et al. |
| 2006/0233694 | A1 | 10/2006 | Sandhu et al. |
| 2006/0249388 | A1 | 11/2006 | Chang et al. |
| 2006/0286023 | A1 | 12/2006 | Huang |
| 2007/0056852 | A1* | 3/2007 | Kubo et al. ............ 204/403.14 |
| 2007/0287034 | A1* | 12/2007 | Minteer et al. ............ 429/2 |
| 2008/0044721 | A1* | 2/2008 | Heller et al. .............. 429/43 |

OTHER PUBLICATIONS

Giguere et al., Application of Commercial Microwave Ovens to Organic Synthesis, Tetrahedron Letters, vol. 27, No. 41, pp. 4945-4948, (1986).

Loupy et al., Solvent-Free Microwave Organic Synthesis As an Efficient Procedure for Green Chemistry, C. R. Chimie, vol. 7 (2004) pp. 103-112.

Lewis et al., Accelerated Imidization Reactions Using Microwave Radiation, Journal of Polymer Science, 30 (1992) pp. 1647-1653.

Katz et al., A Non-Compartmentalized Glucose | $O_2$ Biofuel Cell by Bioengineered Electrode Surfaces, Journal of Electroanalytical Chemistry, vol. 479 (1999), pp. 64-68.

Cai at al., Direct Electron Transfer of Glucose Oxidase Promoted by Carbon Nanotubes, Analytical Biochemistry, vol. 332, (2004), pp. 75-83.

A. P. Graham et al., "Towards the Integration of Carbon Nanotubes in Microelectronics," Diamond and Related Materials 13 (2004) 1296-1300.

Choi, W. B. et al, "Carbon Nanotube for Nanoelectronics", IEEE NANO 2003, San Francisco, CA, 2003.

D. A. Kurnosov, et al., "Influence of the Interelectrode Distance in Electrophoretic Cold Cathode Fabrication on the Emission Uniformity," Applied Surface Science 215 (2003) pp. 232-236.

G. S. Duesberg et al., "Growth of Isolated Carbon Nanotubes with Lithographically Defined Diameter and Location," Nano Letters, 2003. vol. 3, No. 2, pp. 257-259.

S. Duesberg et al., "Ways Towards the Scaleable Integration of Carbon Nanotubes into Silicon Based Technology," Diamond and Related Materials 13 (2004) pp. 354-361.

H. Kim et al., "Parallel Patterning of Nanoparticles via Electrodynamic Focusing of Charged Aerosols," Nature Nanotechnology, vol. 1, Nov. 2006, pp. 117-121.

H. Ma, et al., "Electron Field Emission Properties of Carbon Nanotubes-Deposited Flexible Film,"Applied Surface Science 251 (2005) pp. 258-261.

J. Bae et al, "Field Emission Properties of Carbon Nanotubes Deposited by Electrophoresis," Physica B 323 (2002), pp. 168-170.

J. Hahn et al., "Fabrication of Clean Carbon Nanotube Field Emitters," Applied Physics Letters 88,113101 (2006).

K. Yamoto et al., "Orientation and Purification of Carbon Nanotubes Using AC Electrophoresis," J. Phys. D: Appl. Phys. 31 (1998), pp. L34-L36.

Merkulov et al., "Alignment Mechanism of Carbon Nanofibers Produced by Plasma-Enhanced Chemical-Vapor Deposition," Applied Physics Letters, vol. 79, No. 18, Oct. 29, 2001, pp. 2970-2972.

W. B. Choi et al., "Electrophoresis Deposition of Carbon Nanotubes for Triode-Type Field Emission Display," Applied Physics Letters, vol. 78, No. 11, Mar. 12, 2001, pp. 1547-1549.

W. B. Choi, "Ultrahigh-Density Nanotransistors by Using Selectively Grown Vertical Carbon Nanotubes," Applied Physics Letters, vol. 79, No. 22, Nov. 26, 2001, pp. 3696-3698.

W. Hoenlein et al., "Carbon Nanotubes for Microelectronics: Status and Future Prospects," Materials Science and Engineering C23 (2003) pp. 663-669.

Y. Lin et al., Glucose Biosensors Based on Carbon Nanotube Nanoelectrode Ensembles, 4 Nano Lett. 191-195 (2004).

\* cited by examiner (a) (b)

(a)

(b)

Glucose $\longrightarrow$ Gluconolactone + 2H$^+$ + 2e$^-$ (a)

(b)

INTEGRATED BIOFUEL CELL WITH ALIGNED NANOTUBE ELECTRODES AND METHOD OF USE THEREOF

CROSS REFERENCE TO RELATED APPLICATIONS

This application claims the benefit of U.S. Provisional Application No. 60/790,333 filed Apr. 7, 2006, all of which is herein incorporated in its entirety.

TECHNICAL FIELD

The present disclosure relates to the fields of biological fuel cells and nanomaterial technology.

BACKGROUND

Fuel Cells

Research to develop biological fuel cells ("biofuel cells") dates back to the 1960s. The working principle is similar to that of conventional chemical fuel cells; however, biofuel cells typically avoid the use of expensive noble metals as catalysts like platinum and ruthenium. Rather, biofuel cells use biocatalysts such as enzymes, or even whole organisms, to catalyze the conversion of chemical energy into electricity.

A basic biofuel cell can generally operate in two ways. It can use biological catalysts—enzymes extracted from biological systems—to oxidize fuel molecules at the anode and to enhance oxygen reduction at the cathode of the biofuel cell. Alternatively, whole microbial cells can be used to supply the biofuel cells with the fuel. In both cases the main scientific problem is the electrical coupling of the biological components of the system with the fuel cell's electrodes. Molecules known as electron-transfer mediators can provide efficient transport of electrons between the biological components, enzymes or microbial cells, and the electrodes of the biofuel cell.

Nanomaterials and Single Wall Nanotubes ("SWNTs")

There has been interest in nanomaterials, more specifically carbon nanotubes ("CNTs"), since their discovery by Iijima in 1991, partly because of their structural and electronic properties. Single wall carbon nanotubes ("SWNTs") are the fundamental form of carbon nanotubes with electronic properties that emerge due to their one dimensionality. A SWNT comprises a single hexagonal layer of carbon atoms (a graphene sheet) that has been rolled up to form a seamless cylinder.

SWNTs have no functional groups and are consequently quite inert. Limited reactivity arises due to the curvature-induced stress from the non-planer $sp^2$ carbons and the misaligned $\pi$ orbitals. While there is a wealth of literature on the derivatization of the SWNTs, two general approaches appear to be 1,3-dipolar cycloaddition, and the oxidation of some of the atoms at the tube ends or on the tube wall, and then substitution of the functionality thus formed (—F, —OH, —COOH). At this point, a variety of synthetic organic reactions can be carried out. An example of the former approach is a reaction with azomethine. The latter approach, on the other hand, requires a more aggressive oxidation, such as, refluxing with $HNO_3$, ozonation, or reaction with solid KOH.

Solubility, in both water and organic solvents, is an issue in the functionalization of nanomaterials. One disadvantage of many nanomaterials is their limited solubility in common solvents. Solubility of nanomaterials, specifically carbon nanotubes, in water would allow chemical derivatization and manipulation of the nanotubes to be facilitated simply and less expensively.

Efforts have been made to make carbon nanotubes stably dispersed or soluble in water and in organic solvents, but to date the solubilities observed have been relatively low—typical values at room temperature range from 0.06 to 0.08 mg of SWNT per milliliter of solvent. Different strategies have been employed to achieve dispersion including shortening the SWNTs as well as prolonged and vigorous acid treatment. Dispersion of full-length nanotubes has mostly been achieved by non-covalent wrapping of water-soluble macromolecules on the nanotubes.

Much of the effort aimed at SWNT functionalization has involved the use of conventional chemical techniques, such as refluxing and sonication. Many of these reactions need to be carried out over a long period of time. For example, for carboxylation, the reaction mixture was typically refluxed in conc. $HNO_3$ for 10 to 50 hrs. Further functionalization, such as, diimide-activated amidation and 1,3-dipolar cycloaddition may require additional days of reaction time. The functionalization of carbon nanotubes by conventional chemical processing is a tedious and time-consuming process. Consequently, there is a need to develop techniques for rapid chemical functionalization of carbon nanotubes.

Microwaves

Microwaves are electromagnetic radiation in the 0.3-300 GHz frequency range (corresponding to 0.1-100 cm wavelength). To avoid interference with communication networks, all microwave heaters (domestic or scientific) are designed to work at either 2.45 GHz or 0.9 GHz, of which, the former is more prevalent. According to Planck's law, the energy at this wavelength is 0.3 cal/mol, and is therefore insufficient for molecular excitation, thus most of the energy is used in substrate heat-up. The mechanism of microwave heating is different from that of conventional heating, where heat is transferred by conduction, convection or radiation. In microwave heating, electromagnetic energy is transformed into heat through ionic conduction and the friction due to rapid reorientation of the dipoles under microwave radiation. The larger the dipole moment of a molecule, the more vigorous is the oscillation in the microwave field, consequently more heating. This type of heating is fast, has no inertia, and is in-situ without heating the surroundings.

Chemistry under microwave radiation is known to be quite different, fast and efficient (Gedye et al., *Tetrahedron Lett.*, 27 (1986) 279; Giguere et al., *Tetrahedron Lett.*, 27 (1986) 4945; Loupy et al., *Chimie*, 7 (2004) 103-112). It also reduces the need for solvents, thus it is eco-friendly. Some of the reported advantages are rapid reactions under controlled temperature and pressure (especially in a closed system), higher purity products achieved due to short residence times at higher temperatures, and better yields even at very short residence times. Another factor is that during dipolar polarization under microwave radiation, the activation parameters are modified. For example, it has been reported by Lewis that during imidization of polyamic acid, the activation energy reduced from 105 to 57 KJ/mol. (Lewis et al., *J. Polym. Sci.*, 30A (1992) 1647) (All referenced cited in this paragraph are herein incorporated by reference in their entirety).

Composites

Investigations have been conducted on the SWNT based composites by both theoretical and experimental means. These prior art approaches involve, among other things, dispersion, melt mixing, milling, covalent grafting or in-situ growing of SWNTs in different polymer or ceramic matrices to achieve the certain composite. The results, however, conflict among studies wherein some studies revealed that the introduction of SWNTs in polymer clearly enhances both the physical and mechanical properties while others showed that the carbon nanotube contributed no mechanical improvement to the composites.

The ineffective utilization of nanotubes as reinforcement in composites is normally suffered from two factors, non-uniform dispersion of carbon nanotubes in a matrix and poor interfacial bonding between them. The latter one consequently will result in low efficiency of load transfer across the nanotube/matrix interface, and the pull-out of carbon nanotubes from the matrix can be observed when the composites are under extension.

The observed ineffective utilization of carbon nanotubes as the reinforcing material in many of these composites has been attributed to the non-uniform dispersion of carbon nanotubes, and the poor interfacial adhesion to the matrix. For example, the latter results in ineffective load transfer across the nanotube/matrix interface, and the "pullout" of carbon nanotubes has been observed when the composite is under strain. One issue has been the high temperature and reactivity of some of the current methodologies, which can destroy and/or damage the carbon nanotubes.

BACKGROUND ART

A non-compartmental biofuel cell including glucose oxidase (GOx) for the anode or oxidizing electrode is known in the art. This non-compartmental biofuel cell uses glucose oxidase (GOx) in the anode, which results in an oxygen-insensitive anode system that could react directly in the bloodstream. Katz et al., *A non-compartmentalized glucose|$O_2$ biofuel cell by bioengineered electrode surfaces*, J. Electroanalytical Chem. 479 (1999) 64-68. Katz's method utilizes a gold plate on which an enzyme complex of GOx, plus an electron transfer mediator, coupled with a maleimide monolayer is constructed.

Another type of biofuel cell is a biofuel cell cathode, described in Minteer's U.S. Patent Application Publication, 2005/0095466. This biofuel cell consists of an organic cathode made of a catalytic enzyme, an electron transfer mediator, and a metallic electrode. This conventional biofuel cell technology, utilizes an electron transfer mediator like a protein or protein by-product combined with an electrode, which is preferably metallic.

Carbon nanotubes have been used in the prior art by Cai as replacements for electron transfer mediators. Cai at al., *Direct electron transfer of glucose oxidase promoted by carbon nanotubes*, Anal. Biochem. 332 (2004) 75-83. Cai discusses transfer electrons (electricity) from complex enzymes like GOx. Due to the complexity of the enzymes, it is difficult to immobilize them on the carbon nanotube surface while still retaining their chemical properties. Their complexity also makes access to the reaction centers within these enzymes difficult. Cai attempts to address these issues through the modification of a carbon nanotube to absorb GOx. Cai's modifications entail placing free-floating carbon nanotubes in a suspension. Additionally, Cai uses a surfactant to disperse the carbon nanotubes into the solvent in order to combine it with GOx.

Choi US Patent Application 2005/0118494 discloses a specific process in which one can build a biofuel cell anode or cathode by layering either metal or carbon nanotube to construct a vertical array of nanowires (such as gold wires of nanometers in width) or carbon nanotubes perpendicular to a conductive base. Choi discloses that with the Langmuir-Blodgett lift-off ("LB") process, one can coat the resulting structure with glucose oxidase and other enzymes. Choi discloses building the multiple-layered electrode base with a gold or titanium base over some other non-metallic conductor.

To date it has not been possible to fabricate practical biological fuels and/or biological fuel cells. Current biofuel cells fabricated using presently available technologies suffer from low power densities and short lifetimes. This is due to, among other things, the long-term chemical fragility of the enzymes, cost of electron mediator compounds, the need of complex organic structures for electron transfer, inefficient micro-fluidics and cross-over of fuel through the polymer electrolyte membranes. These and other needs are addressed and/or overcome by the present disclosure.

SUMMARY

The present disclosure provides for a biofuel cell system including an anode electrically coupled to a cathode, an electrolyte in electrical communication with the anode and the cathode, a first nanomaterial on a first substrate, the first nanomaterial on the first substrate having at least one first enzyme immobilized with respect to the first nanomaterial as the anode, a second nanomaterial on a second substrate, with the second nanomaterial on the second substrate having at least one second enzyme immobilized with respect to the second nanomaterial as the cathode.

The present disclosure also provides for a biofuel cell system, wherein at least one of the first and second nanomaterial is selected from the group consisting of single wall carbon nanotubes (SWNTs), multiwall carbon nanotubes (MWNTs), carbon nanohorns, fullerenes, nano onions, nanocomposites and combinations thereof.

The present disclosure also provides for a biofuel cell system, wherein the at least one first enzyme is immobilized with respect to the first nanomaterial by an electrochemical process; and wherein the at least one second enzyme is immobilized with respect to the second nanomaterial by an electrochemical process. In an alternative embodiment, the present disclosure also provides for a biofuel cell system, wherein the at least one first enzyme is immobilized with respect to the first nanomaterial by a microwave-assisted process; and wherein the at least one second enzyme is immobilized with respect to the second nanomaterial by a microwave-assisted process.

The present disclosure also provides for a biofuel cell system, wherein the at least one first enzyme immobilized with respect to the first nanomaterial as the anode includes glucose oxidase (GOx); and wherein the at least one second enzyme immobilized with respect to the second nanomaterial as the cathode includes bilirubin oxidase (BOD). In one embodiment, the electrolyte includes 100 mM β-D-glucose in pH 7 phosphate buffer. In an alternative embodiment, present disclosure provides for a biofuel cell system, wherein the at least one first enzyme immobilized with respect to the first nanomaterial as the anode includes glucose oxidase (GOx); and wherein the at least one second enzyme immobilized with respect to the second nanomaterial as the cathode includes laccase.

The present disclosure also provides for a biofuel cell system, wherein the first and second substrates are silicon. In an alternative embodiment, the first and second substrates are porous silicon. In another embodiment, the first and second substrates are polymeric substrates. In another embodiment, the first and second substrates are nanotube membranes.

The present disclosure also provides for a biofuel cell system, wherein the first and second nanomaterials are vertically oriented on the first and second substrates.

The present disclosure also provides for a biofuel cell system, wherein at least one micro-fluidic channel is located on the first substrate, and wherein at least one micro-fluidic channel is located on the second substrate. In one embodiment, the at least one micro-fluidic channel located on the first substrate suctionally communicates with the first nanomaterial, and the at least one micro-fluidic channel located on the second substrate suctionally communicates with the second nanomaterial.

The present disclosure also provides for a biofuel cell system further including at least two fullerene molecules, wherein at least one fullerene molecule is chemically tethered to the first nanomaterial, and wherein at least one fullerene molecule is chemically tethered to the second nanomaterial.

The present disclosure also provides for a biofuel cell system further including a porous polymer, and wherein the electrolyte is immobilized in the pores of the porous polymer. In one embodiment, the porous polymer is poly-tetrafluoroethylene (PTFE). In another embodiment, the biofuel cell system further includes a porous polymer, wherein the electrolyte is immobilized in the pores of the porous polymer, and wherein the biofuel cell system is utilized as an implanted device.

The present disclosure also provides for a biofuel cell system further including a bio-compatible polymer, wherein the bio-compatible polymer encompasses the biofuel cell system. In one embodiment, the biofuel cell system further includes a bio-compatible polymer, wherein the bio-compatible polymer encompasses the biofuel cell system, and wherein the biofuel cell system is utilized as an implanted device.

The present disclosure also provides for a method for producing a nanomaterial substrate system including: providing nanomaterial on a substrate, utilizing a catalyst deposition step to deposit catalyst/promoter precursor on the substrate, utilizing a chemical vapor deposition ("CVD") step, and immobilizing at least one enzyme to the nanomaterial. In one embodiment, the nanomaterial is selected from the group consisting of single wall carbon nanotubes (SWNTs), multiwall carbon nanotubes (MWNTs), carbon nanohorns, fullerenes, nano onions, nanocomposites and combinations thereof.

The present disclosure also provides for a method for producing a nanomaterial substrate system, wherein the substrate is silicon. In another embodiment, the substrate is porous silicon. In another embodiment, the substrate is a polymeric substrate. In another embodiment, the substrate is a nanotube membrane.

The present disclosure also provides for a method for producing a nanomaterial substrate system, wherein the nanomaterial is vertically oriented on the substrate.

The present disclosure also provides for a method for producing a nanomaterial substrate system, wherein the catalyst/promoter precursor is deposited on the substrate with a dip coating technique. In another embodiment, the catalyst/promoter precursor is deposited on the substrate with a spin coating technique.

The present disclosure also provides for a method for producing a nanomaterial substrate system, wherein the chemical vapor deposition ("CVD") step includes ethanol chemical vapor deposition.

The present disclosure also provides for a method for producing a nanomaterial substrate system, wherein the at least one enzyme includes β-NAD (nicotinamide adenine dinucleotide) synthetase.

The present disclosure also provides for a method for producing a nanomaterial substrate system, further including the step of utilizing the nanomaterial substrate system as a biosensor.

The present disclosure also provides for a method for producing a nanomaterial substrate system, further including the step of utilizing the nanomaterial substrate system as an enzymatic sensing electrode in a biofuel cell.

The present disclosure also provides for a method for producing a nanomaterial substrate system, further including the step of utilizing the nanomaterial substrate system as a glucose biosensor in a biofuel cell consisting of a platinum electrode, wherein the nanomaterial includes SWNTs and the at least one enzyme includes glucose oxidase (GOx).

The present disclosure also provides for an electrode including a nanomaterial vertically oriented on a substrate, having at least one enzyme immobilized with respect to the nanomaterial. In one embodiment, the nanomaterial is selected from the group consisting of single wall carbon nanotubes (SWNTs), multiwall carbon nanotubes (MWNTs), carbon nanohorns, fullerenes, nano onions, nanocomposites and combinations thereof.

The present disclosure also provides for an electrode, wherein the at least one enzyme is immobilized with respect to the nanomaterial by an electrochemical process. In another embodiment, the at least one enzyme is immobilized with respect to the nanomaterial by a microwave-assisted process.

The present disclosure also provides for an electrode, wherein the substrate is selected from the group consisting of silicon, porous silicon, polymeric substrates, and nanotube membranes. In another embodiment, at least one micro-fluidic channel is located on the substrate. In another embodiment, the at least one micro-fluidic channel located on the substrate suctionally communicates with the nanomaterial.

The present disclosure also provides for an electrode, wherein the electrode is utilized as an enzymatic sensor in a biofuel cell. In another embodiment, the electrode is utilized as a nanoelectrode in an electrochemical cell. In another embodiment, the electrode is utilized as a biosensor. In another embodiment, the electrode is utilized in a biofuel cell.

BRIEF DESCRIPTION OF THE DRAWINGS

To assist those of ordinary skill in the relevant art in making and using the subject matter hereof, reference is made to the appended drawings, wherein:

FIG. 21(C) depicts typical Raman spectrum excited using 632.8 nm radiation of SWNTs on p-Si.

DETAILED DESCRIPTION

Figure 1:
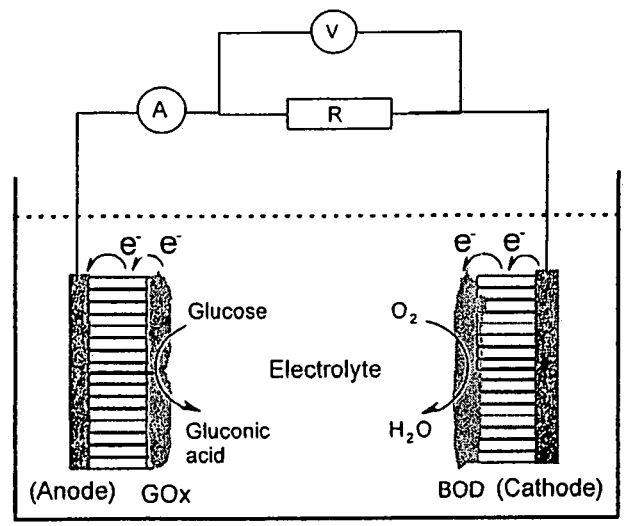
FIG. 1 is a schematic of one embodiment of a non-compartmentalized biofuel cell.

The present disclosure provides for a method of forming, producing or manufacturing functionalized and soluble nanomaterials, most specifically carbon nanotubes on a substrate, which can be used in the production or manufacture of biofuel cells. In one embodiment, the substrate is a doped silicon wafer. In another embodiment, the substrate is a gold-coated polymeric substrate. In another embodiment, the substrate is a free-standing nanotube membrane.

One embodiment of the present disclosure provides for the coupling of biofuel cells with a nanomaterial, wherein the nanomaterial supports catalytic enzymes. In one embodiment, carbon nanotubes are used to support catalytic enzymes. This integrated biofuel cell eliminates the need for expensive electron-transfer mediators, and can also function as a biosensor.

Another embodiment of this disclosure utilizes microwaves to couple or bond enzymes to the nanotubes to give efficient fuel cell and biosensor performance, thereby permitting non-compartmentalized biofuel cell and biosensor performance without the use of membranes.

Another embodiment of the present disclosure provides for the construction of a biofuel cell, wherein the application of a microwave process, and/or an electrochemical technique, is used to develop a biofuel cell having nanomaterial/enzyme-based electrodes on a substrate. In one embodiment, the substrate is an electrochemically fabricated porous silicon wafer platform. This embodiment provides efficient microfluidics at low cost. Another embodiment of the biofuel cell involves the growth of vertically-aligned SWNTs on etched porous silicon membranes having nano- and micro-scale hierarchies of fluidic channels, which can be used as-prepared, or alternatively transferred by contact removal techniques to flexible polymeric substrates.

Another embodiment provides for the application of a microwave process, and/or an electrochemical technique, to build a biofuel cell with nanomaterial/enzyme-based electrodes on flat and porous silicon wafers. In an alternative embodiment, the nanomaterial/enzyme-based electrodes are contact-transferred to conductive plastic substrates having micro-machined channels. These channels enable nanoscale fluidic transport of the biofuel (glucose, for example), oxidizer (oxygen, for example) and reaction products (primarily water, for example) at the electrodes.

In another embodiment of the present disclosure, a series of micro-wells and microfluidic channels on the substrate facilitate the holding of nanotubes in place on the substrate using suction. In one embodiment, these micro-wells and microfluidic channels are located on the substrate, which could include, but is not limited to, a doped silicon wafer. In another embodiment, these micro-wells and micro-fluidic channels are created by an electrochemical etching process.

Another embodiment of the present disclosure provides for a composite of nanomaterial grown on a substrate, coupled to tethered or bonded enzymes, to fabricate direct electron transfer electrodes. In another embodiment, this disclosure provides for a bio-inorganic composite of vertically oriented single wall carbon nanotubes grown directly on conductive silicon wafers, coupled to tethered or covalently bonded enzymes resulting from a rapid microwave process, which makes it possible to fabricate chemically stable, direct electron transfer electrodes. This composite overcomes non-uniform dispersion of SWNTs in the matrix and poor interfacial bonding. Accordingly, this bio-inorganic composite is a candidate for structural reinforcements in the fabrication of high strength, light weight, and high performance composites.

Another embodiment of this disclosure provides for a biofuel cell which uses enzymes immobilized on nanomaterials as electrodes. In one embodiment, this disclosure provides for a biofuel cell which uses specific enzymes immobilized on the molecular-scale tips of oriented single walled carbon nanotubes ("SWNTs") as electrodes. This construction permits quasi-one-dimensional ballistic conductivity of single wall carbon nanotubes in combination with their colossal molecular to nanoscale surface areas, which enhances biofuel cell performance. Additionally the high-rate direct electron transfer eliminates the need for an electron mediator.

Another embodiment of the present disclosure provides for an open, non-compartmentalized integrated biofuel cell that utilizes specific enzymes, such as, for example, glucose oxidase (GOx) and bilirubin oxidase (BOD), immobilized and stabilized by tethering on the molecular-scale tips of SWNTs as the anode and cathode. In one embodiment the anode could consist of GOx functionalized, oriented SWNTs on silicon and the cathode could consist of oriented SWNTs on silicon, and functionalized with BOD. These anode and cathode enzymes are immobilized and stabilized by tethering on the molecular-scale tips of SWNTs. Immobilization involves, for example, bonding the enzymes to the nanotubes. The one-dimensional ballistic electrical conductivity of the carbon nanotubes enables high rate direct electron transfer, which eliminates the need for expensive and sometimes unstable compounds or biochemically engineered enzymes needed for electron transfer.

Alternatively, the electron transfer in nanomaterials is achieved by chemical tethering the structurally compatible fullerene molecules to the nanomaterial. In another embodiment, the electron transfer in SWNTs is achieved by chemical tethering the structurally compatible fullerene $C_{60}$ molecules to the nanotube walls. $C_{60}$ has a highly delocalized, three-dimensional electronic structure, which is very suitable for efficient electron transfer because the uptake and release of electrons results in minimal structural and property changes. Moreover, the covalently bonded tethering of the enzymes allows for non-compartmentalized operation without the need for proton exchange membranes.

Another embodiment of the present disclosure provides for an implanted device system, wherein the electrolyte is immobilized in the pores of a porous polymer, such as, for example, poly-tetrafluoroethylene (PTFE). In another embodiment of an implanted device system, the biofuel cell is wrapped in a bio-compatible polymer. In one embodiment, the implanted device system includes leads connecting to a biomedical device.

The present disclosure includes the application and method of forming, producing or manufacturing rapidly functionalized and highly soluble nanomaterials, more specifically carbon nanotubes, as well as a microwave process and the composites/composite building methods, discussed in U.S. Non-Provisional Utility patent application Ser. No. 11/374,499 filed Mar. 13, 2006 which claimed the benefit of U.S. Provisional Application No. 60/660,802 filed Mar. 11, 2005; U.S. Provisional Application No. 60/767,564 filed Jan. 10, 2006; and U.S. Provisional Application No. 60/767,565 filed Jan. 10, 2006, all of which are herein incorporated in their entirety. These processes are incorporated into at least one embodiment of the present disclosure. In an alternative embodiment, this disclosure also provides for an electrochemical technique, to produce a biofuel cell.

The present disclosure also provides a method for producing a nanomaterial-substrate system. In one embodiment, a method for growing nanomaterials on a substrate and attaching at least one enzyme to the nanomaterial is disclosed. For example, this nanomaterial-substrate system may be used in a biofuel cell system or as a biosensor. In one embodiment, the substrate is a gold-coated polymeric substrate. In another embodiment, the substrate is a free standing nanotube membrane.

In another embodiment, the present disclosure provides for the growth on thin films of vertically aligned SWNTs on silicon wafers using a chemical vapor deposition ("CVD") process with ethanol as the carbon source and densely deposited bimetallic cobalt/molybdenum as catalyst. In one embodiment, glucose oxidase (GOx) and bilirubin oxidase (BOD) enzymes dissolved in a buffer are reacted with the nanotube tips by a rapid microwave process. In an alternative embodiment, GOx and BOD enzymes dissolved in a buffer are reacted with the nanotube tips by an electrochemical reaction.

In another embodiment of the present disclosure, the assembly of a non-compartmentalized glucose/air biofuel cell with SWNT/GOx as anode and SWNT/BOD as cathode in an electrolyte comprised of 100 mM β-D-glucose in pH 7 phosphate buffer is disclosed.

The present disclosure also provides for a biofuel cell that may be utilized as a biosensor. In one embodiment, the biofuel cell may be utilized as a glucose biosensor consisting of a SWNT/GOx sensing electrode. In one embodiment, the biofuel cell may be utilized as a glucose biosensor consisting of a platinum electrode.

Microwave Induced Functionalization of Highly Water-Dispersible Carbon Nanotubes The functionalization of the nanomaterial, specifically carbon nanotubes, serves several functions. Materials such as carbon nanotubes are inert and do not mix and blend easily in most matrices. They are not soluble either, so they can not be processed easily either in, for example, thin films or polymer composites. Functionalization allows the chemical structure of the nanotubes to be modified, and other functional groups, including, but not limited to, polymers, ceramics, biological molecules such as enzymes and other appropriate chemical moeties to be attached.

For the purposes of this application "nanomaterials" can include, but is not limited to, single wall nanotubes (SWNTs), multiwall nanotubes (MWNTs), nanohorns, fullerenes, nano onions and nanocomposites. These nanomaterials also include but are not limited to carbon based nanomaterials such as carbon nanotubes and carbon SWNTs.

In another embodiment, the functionalization may be covalent bonding to the nanotube, or noncovalent adsorption or wrapping. By putting appropriate functionalities, the nanotubes may be rendered soluble in, for example, aqueous, organic, polar, nonpolar, hydrogen bonding, ionic liquids, and other solvents so that they can be processed easily. For example, polymer or ceramic precursors or the like may also be reacted with the nanotubes to form composites, or biological molecules may be attached for drug delivery, sensing or other functions.

The current disclosure provides for, in one embodiment, a rapid and environmentally friendly, microwave induced method, to prepare highly water-dispersible carbon nanotubes. In one embodiment, microwave-assisted functionalization of SWNTs in a mixture of acidic components can be utilized to generate water-dispersible nanotubes. In a further embodiment, microwave-assisted functionalization of SWNTs in a mixture of nitric and sulfuric acids can be utilized to synthesize highly water-dispersible nanotubes with stable concentrations as high as 10 mg/ml in approximately three minutes. The microwave processing time depends on the diameter of the starting SWNTs employed.

In one embodiment, the starting SWNTs were prepared by the high pressure carbon monoxide (HiPCO) chemical vapor deposition process, as described in Nikolaev, P.; Bronikowski, M. J.; Bradley, R. K.; Rohmund, E.; Colbert, D. T.; Smith, K. A.; Smalley, R. E. Chem. Phys. Lett. 1999, 313, 91 and Bronikowski, M. J.; Willis, P. A.; Colbert, D. T.; Smith, K. A.; Smalley, R. E. J. Vac. Sci. Technol. 2001, A19, 1800, which herein are incorporated by reference. The original or starting SWNTs were not soluble (or dispersible) in de-ionized (DI) water, or alcohol even after prolonged sonication. Suspensions were formed where the SWNTs quickly agglomerated and settled down to the bottom of the container. This embodiment could occur in approximately three minutes.

Example 1

In one embodiment, the experiments resulting in functionalization and stable dispersion were carried out in a CEM Model 205 microwave oven with a 100 ml closed-vessel reaction chamber lined with Teflon PFA®, and connected to a 0~200 psi pressure control system. The microwave system could be programmed to operate at different pressures, power levels and time periods. For this embodiment 200 psi pressure and 900 Watts of power were used.

In one reaction of this embodiment, 10 to 20 mg of as-received, pure SWNTs were added to 20 ml of a 1:1 mixture of 70% nitric acid and 97% sulfuric acid aqueous solutions in the reaction chamber. The microwave power was set at 50% of a total of 900 Watts, and the pressure was set at 20 psi. The reaction vessel was then subjected to microwave radiation for 1, 2, 3, 5, 10 and 20 minutes. Functionalization of the SWNTs as determined by FTIR spectroscopy and the dispersion of SWNTs were not observed when the SWNT-acid mixture was not subjected to microwave radiation. Under these conditions three minutes of microwave irradiation was found to be the optimum time for the reaction however by way of example only, the reaction could be conducted in a range of approximately three to fifteen minutes.

At the three minute reaction time, under the described conditions, a large fraction of the SWNTs dispersed in the acid mixture with minimal loss of nanotubes due to microwave-induced oxidation occurred. The mixture was then diluted with DI water, filtered through a 10 μm polytetrafluoroethylene (PTFE) filter paper, and the filtrate was transferred to a dialysis bag with nominal molecular weight cut off of 12,000-14,000 daltons. The bag was placed in a beaker containing DI water. The DI water was continually replaced until the pH of the filtrate in the bag reached 7. The filtrate was then removed and concentrated in a vacuum evaporator. The functionalized solid SWNT residue obtained from the evaporator was dried overnight at room temperature in vacuum and used for quantitative solubility testing, and for the characterization measurements discussed below.

Field emission scanning electron microscope (SEM) images were taken using a LEO 1530 electron microscope, and transmission electron microscope (TEM) images were recorded using a TOPCON 200 kV ultra-high resolution microscope. The SEM images were obtained on microwaved SWNTs deposited on a conducting silicon wafer from a concentrated aqueous solution of the nanotubes, while the TEM images were obtained on thin films deposited on TEM grids from a dilute methanol solution of the microwaved SWNTs.

The infrared and Raman spectra were recorded using a Perkin Elmer FTIR spectrometer and a Horiba/Jovin Yvon Lab Ram system with 632.8 nm excitation, respectively. FTIR measurements were made on thin films deposited from a methanol solution of SWNTs on a single crystal sodium chloride plate. The Raman spectra were measured on aqueous solutions of the microwaved SWNTs and on the functionalized SWNT solids. The thermogravimetric analyses (TGA) were performed using a Universal V3.7A instrument on pristine and microwave functionalized SWNTs.

Laser light scattering particle size measurements on aqueous solutions of microwave functionalized SWNTs were performed with a Beckman Coulter N4 Plus Submicron Particle Size Analyzer, which has an effective detection range from 3 to 800 nm. Sheet electrical conductivities along SWNT membrane surfaces, which all have an area of 2.54×2.54 $cm^2$, were measured. The free standing SWNT membranes were self-assembled, washed, dried and removed after slow vacuum filtration of dispersions and suspensions of the nanotubes in water through PTFE filter paper. Two silver pads deposited on the membrane were used as the electrical contacts. The average membrane thicknesses were measured using a micrometer.

Figure 2:
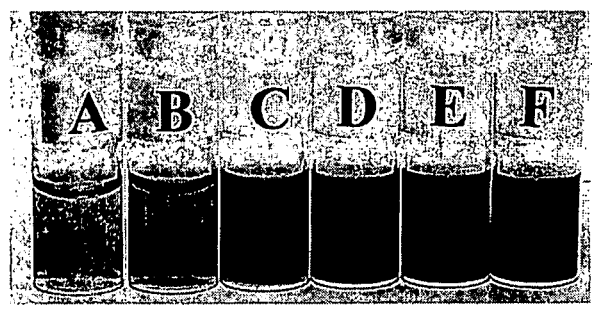
FIG. 2 consists of photographs of SWNTs solution in de-ionized water: (A) 0.05 mg/ml, (B) 0.1 mg/ml, (C) 0.2 mg/ml, (D) 0.3 mg/ml, (E) 0.5 mg/ml and (F) 2 mg/ml.

The acid-functionalized SWNTs obtained after microwave treatment were highly dispersible in DI water and ethanol under ambient conditions. Dispersed concentration of 10 and 2.5 mg per milliliter (ml) were obtained in water and anhydrous alcohol respectively. A significantly higher concentration up to 20 mg per ml was obtained in acidified water. The dispersions showed no indication of SWNT precipitation after prolonged standing (months) under ambient conditions. Photographs of typical aqueous dispersions of different concentrations of the microwave functionalized SWNTs are shown in FIG. 2. FIG. 2 consists of photographs of SWNTs solution in de-ionized water: (A) 0.05 mg/ml, (B) 0.1 mg/ml, (C) 0.2 mg/ml, (D) 0.3 mg/ml, (E) 0.5 mg/ml and (F) 2 mg/ml.

Laser light scattering particle size measurements at detection angles of 62.2 and 90 degrees of the aqueous dispersions of microwave functionalized SWNTs were compared with measurements made on an aqueous suspension of pristine SWNTs. The suspension prepared by sonication of 0.01 weight % SWNTs (0.1 mg per ml) and 0.5 weight % of the surfactant Triton X-100 showed particle sizes ranging from 100 to 600 nm with a maxima at 300 nm. In contrast, a 0.5 mg/ml aqueous dispersion of microwave functionalized SWNTs (FIG. 2E) did not show evidence for the existence of particles in the 3 to 800 nm size range at the same detection angles, indicating that the functionalized SWNTs might have dispersed to have formed a true solution.

Figure 3:
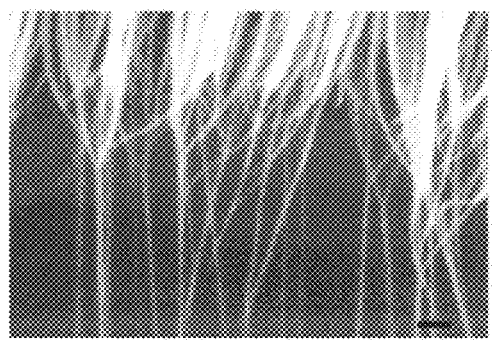
FIG. 3 depicts scanning electron microscope (SEM) images of microwave functionalized SWNTs: (A) Higher magnification SEM image showing alignment along the substrate of the SWNTs deposited from aqueous solution discussed in the text, scale bar=50 nm; (B) Lower magnification SEM image of the aligned SWNTs, scale bar=500 nm.
Figure 3:
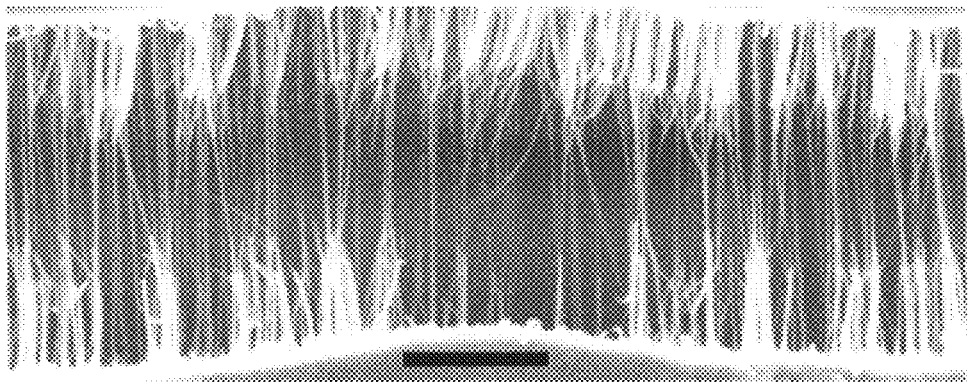

SEM images of the microwave functionalized SWNT bundles are shown in FIGS. 3 A and B. FIG. 3 depicts scanning electron microscope (SEM) images of microwave functionalized SWNTs: (A) Higher magnification SEM image showing alignment of the SWNTs deposited from aqueous solution discussed in the text, scale bar=50 nm; (B) Lower magnification SEM image of the aligned SWNTs, scale bar=500 nm. Based on the TEM results obtained from more dilute dispersions in methanol, it is evident that the bundles are weakly held together, since the images show large numbers of individual tubes and thin bundles. The functionalized SWNTs for SEM imaging were deposited as a thin film from a drop of aqueous dispersion on a silicon wafer. The images show that the deposited bundles were aligned parallel to one another along the substrate probably due to hydrophobic forces and nanotube-nanotube interactions. This alignment was observed each time after the evaporation of a drop of SWNT dispersion. The average length of the aligned SWNTs was around 1 μm (FIG. 3B). This might indicate an oxidation-induced reduction in length of SWNTs as a result of the microwave treatment. Lowering the acid concentration, reaction pressure and microwave power may minimize this length reduction.

Figure 4:
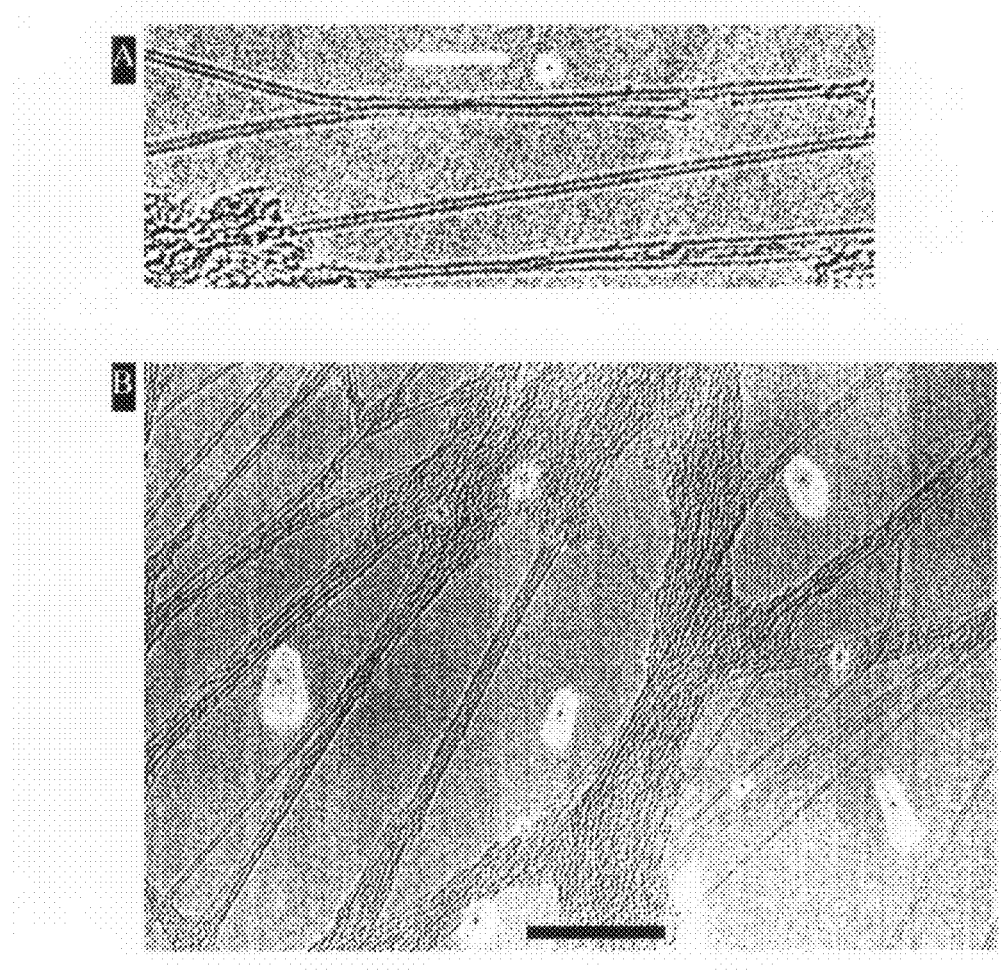
FIG. 4 depicts transmission electron microscope (TEM) images of microwave functionalized SWNTs on a holey carbon covered grid: (A) Typical high resolution TEM image of microwave functionalized SWNTs, scale bar=10 nm showing some bundling and individual tubes; (B) TEM image of large scale debundled SWNTs, scale bar=20 nm.

FIG. 4 depicts transmission electron microscope (TEM) images of microwave functionalized SWNTs on a holey carbon covered grid: (A) Typical high resolution TEM image of microwave functionalized SWNTs, scale bar=10 nm showing some bundling and individual tubes; (B) TEM image of large scale debundled SWNTs, scale bar=20 nm. A typical high resolution TEM image from microwave functionalized SWNTs in FIG. 4A showed individual and thin SWNT bundles with uneven, disordered sidewalls due to extensive side group functionalization. The lower magnification TEM in FIG. 4B showed that most of SWNTs were debundled into individual tubes or very thin bundles. The individual tubes in the bundles deposited from concentrated aqueous solution observed in the SEM images (FIGS. 3 A and B) were probably exfoliated in the dilute methanol solution used for TEM sample preparation to form mostly individual nanotubes or thin bundles.

Figure 5:
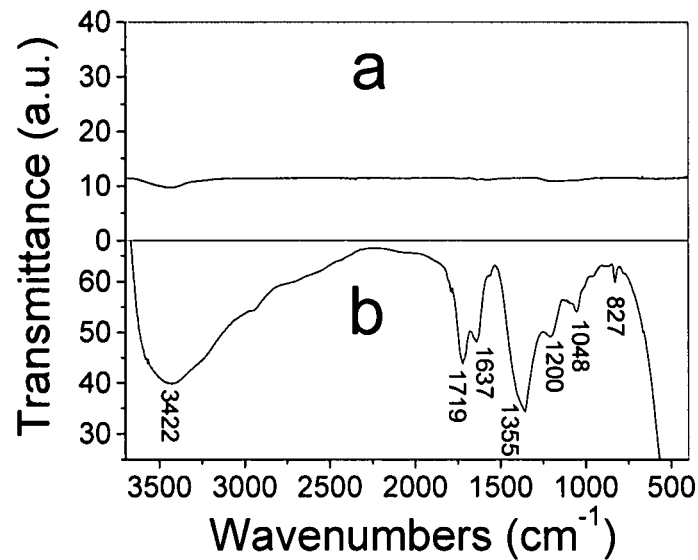
FIG. 5 depicts Fourier transform infrared (FTIR) spectra of microwave functionalized SWNTs: (A) pristine SWNTs in KBr pellet; (B) microwave functionalized SWNTs from a thin film deposited from methanol dispersion on to a NaCl window.

FIG. 5 depicts Fourier transform infrared (FTIR) spectra of microwave functionalized SWNTs: (A) pristine SWNTs in KBr pellet; (B) microwave functionalized SWNTs from a thin film deposited from methanol dispersion on to a NaCl window. FTIR spectra of the microwave functionalized SWNTs were obtained to determine the structure of the chemical groups formed on the nanotube sidewalls and tube ends. Like graphite, the FTIR spectrum of the pristine nanotubes (FIG. 5a) is practically featureless with extremely low infrared absorption intensities. After the microwave-induced functionalization a typical FTIR spectrum (FIG. 5b) showed a number of infrared lines, which were assigned as follows: The line at 1719 $cm^{-1}$ was assigned to the C=O stretching mode of the —COOH groups (where the carbon is from the SWNT backbone) on the SWNTs, whereas the intense, broad line centered at 3422 $cm^{-1}$ was assigned to the —OH stretching mode of the —COOH group. The line at 1637 $cm^{-1}$ was assigned to the SWNT C=C graphitic stretching mode that is infrared-activated by extensive sidewall functionalization. The strong line observed at 1355 $cm^{-1}$ was assigned to the asymmetric $SO_2$ stretching mode of the acid sulfonate (—$SO_2$.OH) group, whereas the lower frequency line at 1200 $cm^{-1}$ was assigned to the $SO_2$ symmetric stretching mode. The shoulder near 2600 $cm^{-1}$ was assigned to the —OH group of the sulfonic acid group. The FTIR spectrum is consistent with elemental analysis of the functionalized SWNTs, which showed that one in three carbon atoms on the SWNT backbone was carboxylated, and one in ten was sulfonated. In addition, an FTIR spectrum taken in KBr (not shown) showed a line of medium intensity at 592 $cm^{-1}$, which was assigned to the C—S stretching mode, thus implying that the acid sulfonate functionalization was covalent. In some samples, the presence of trace water formed the hydrated sulfonic acid group, —$SO_3^-H^+ H_2O$, which gave rise to a strong infrared line at 1114 $cm^{-1}$ assigned to the asymmetric stretching mode of $SO_3$, and a shoulder near 1000 $cm^{-1}$ assigned to the corresponding symmetric stretching mode. The combination of extensive carboxylation and acid sulfonation on the SWNTs resulted in charge transfer-induced formation of an SWNT polyelectrolyte salt in the presence of polar solvent molecules followed by dissolution via ionic dissociation.

Figure 6:
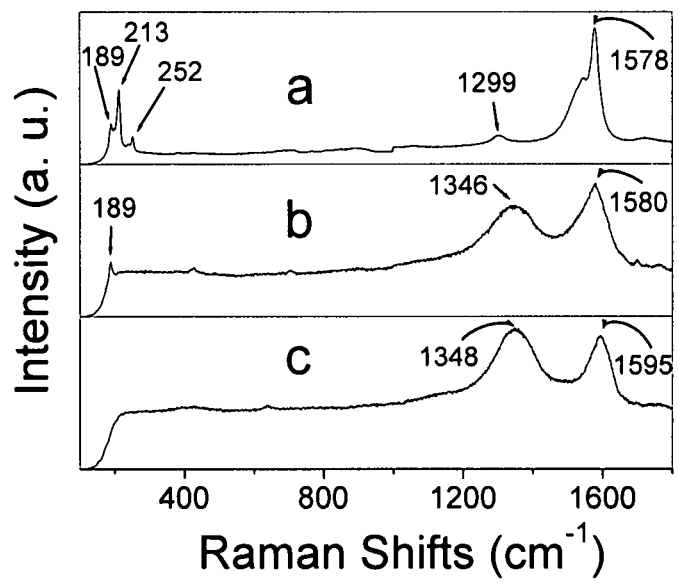
FIG. 6 depicts Raman spectra (excited by 632.8 nm laser radiation) of microwave functionalized SWNTs: (A) pristine SWNTs, (B) microwave functionalized SWNTs in solid phase precipitated by evaporation from an aqueous dispersion of 0.5 mg SWNTs in 1 ml, and (C) dispersion of 2.0 mg microwave functionalized SWNTs per ml deionized (DI) water.

FIG. 6 depicts Raman spectra (excited by 632.8 nm laser radiation) of microwave functionalized SWNTs: (A) pristine SWNTs, (B) microwave functionalized SWNTs in solid phase precipitated by evaporation from an aqueous dispersion of 0.5 mg SWNTs in 1 ml, and (C) dispersion of 2.0 mg microwave functionalized SWNTs per ml deionized (DI) water. As compared to the starting SWNTs of FIG. 6a, the Raman spectrum (FIG. 6c) of an aqueous dispersion of the microwave functionalized SWNTs showed an upshift of the C—C tangential mode frequency at 1597 $cm^{-1}$ by about 20 $cm^{-1}$ and also the radial breathing modes (RBMs) disappeared. These are known to be characteristic of charged SWNTs. The RBM lines however appeared in the solid state as the SWNTs were precipitated from a dispersion by concentration (FIG. 6b). A single RBM line was typically seen in the functionalized SWNTs (FIG. 6b) in contrast to multiple ones in the starting SWNTs (FIG. 6a). This indicated that the microwave process oxidized some of the chemically reactive SWNTs of smaller diameter. After the functionalization, the disorder-induced SWNT line near 1320 $cm^{-1}$ showed a significant increase in intensity both in aqueous solution and in the solid state. This is in agreement with prior art observations in functionalized SWNTs. Similarly, the resonance-enhancement of the Raman spectrum observed in the starting SWNTs was significantly reduced for the functionalized SWNTs.

Figure 7:
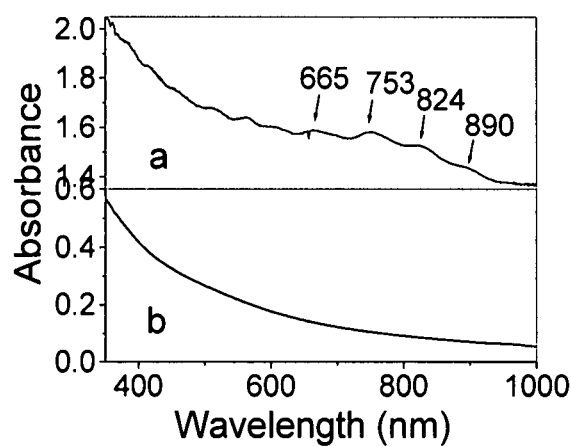
FIG. 7 depicts visible-near infrared (vis-NIR) spectra of: (A) Pristine SWNTs suspended in dimethyl formamide (0.05 mg per ml), (B) Aqueous dispersion of microwave reacted SWNTs (0.5 mg per ml).

In order to characterize the electronic states of the microwave functionalized SWNTs, visible-near infrared (vis-NIR) absorption spectra of aqueous dispersions and of a suspension of pristine SWNTs in dimethylformamide were measured. The spectra are shown in FIG. 7. FIG. 7 depicts visible-near infrared (vis-NIR) spectra of: (A) Pristine SWNTs suspended in dimethyl formamide (0.05 mg per ml), (B) Aqueous dispersion of microwave reacted SWNTs (0.5 mg per ml). Interband transitions between so-called van Hove singularities in the one-dimensional electronic density of states of the starting SWNTs were observed at 665, 753, 824 and 890 nm in the spectrum of the pristine SWNTs (FIG. 7a). The corresponding spectrum of the aqueous dispersion of microwave-functionalized solution did not show these transitions resulting from loss of one dimensionality due to side groups on the nanotube walls, confirming the occurrence of microwave-induced SWNT functionalization. This is in agreement with what has been previous reported.

Figure 8:
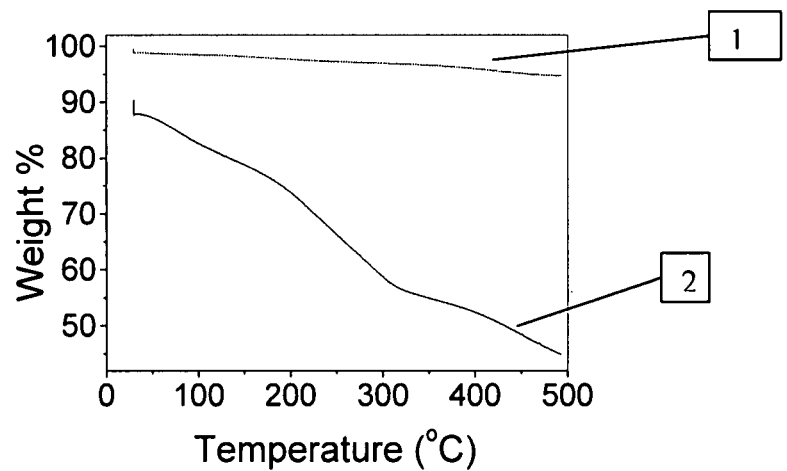
FIG. 8 depicts thermogravimetric analysis (TGA) data under pure nitrogen at a heating rate of 10° C. per minute for pristine and microwave functionalized SWNTs of: (1) pristine SWNTs and, (2) microwave functionalized SWNTs.

The effect of thermal treatment on the functionalized SWNTs was studied by thermogravimetric analysis (TGA) measurements and compared with pristine SWNTs. The heating was carried out under dry nitrogen at a heating rate of 10° C. per minute from 30° to 500° C. The TGA traces (shown in FIG. 8) showed that the functionalized SWNTs decreased in weight by nearly 50%, most likely due to the loss of the functional groups. FIG. 8 depicts thermogravimetric analysis (TGA) data under pure nitrogen at a heating rate of 10° C. per minute for pristine and microwave functionalized SWNTs of: (1) pristine SWNTs and, (2) microwave functionalized SWNTs.

The conductivity of membranes fabricated from both pristine SWNTs and microwave treated SWNTs were measured and compared. The pristine SWNT membrane was made from an aqueous SWNT suspension in a surfactant (Triton-X 100). The surfactant was removed by washing with DI water and methanol, and annealing at 700° C. under argon for one hour. The membrane made from microwave treated SWNTs was fabricated in two steps. In the first step, 150 mg of pristine SWNTs was added to 30 ml of the acid mixture described above, and microwaved for 3 minutes. The acids were removed by filtration and washing with DI water. Then, the SWNTs collected were suspended in water by sonication in a water bath in the absence of a surfactant, and a membrane was deposited by filtering through a PTFE filter paper (0.5 μm pore size).

Figure 9:
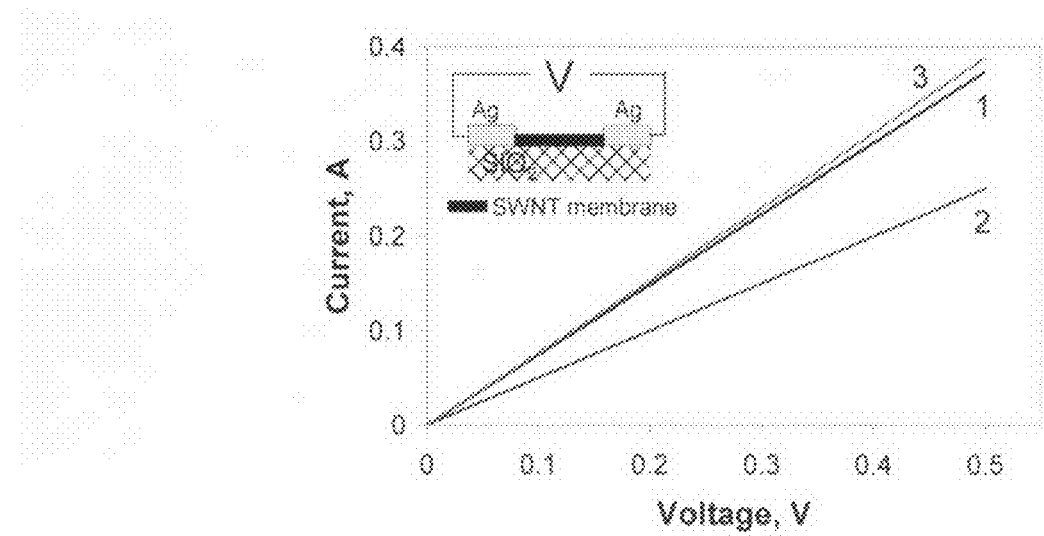
FIG. 9 depicts I-V characteristics of 43 μm thick SWNT membranes, which have an area of 0.1×0.1 square inches. (1) Annealed pristine SWNTs; (2) Microwaved SWNT membrane before annealing; (3) Annealed, microwaved SWNT membrane.

Part of the membrane made from microwave treated SWNTs was also annealed at 700° C. under argon for one hour. Both the annealed and unannealed microwaved SWNT membranes along with the annealed pristine SWNT membrane were used for the conductivity measurements. The measurement set-up is schematically shown as the inset in FIG. 9. FIG. 9 depicts I-V characteristics of 43 μm thick SWNT membranes, which have an area of 0.1×0.1 square inches. (1) Annealed pristine SWNTs; (2) Microwaved SWNT membrane before annealing; (3) Annealed, microwaved SWNT membrane.

FIG. 9 shows the current-voltage (I-V) traces for the three membranes. All showed ohmic behavior. The dc conductivity of the microwaved nanotube membrane (unannealed, curve 2) is reduced by 33%, compared to the pristine SWNT membrane (curve 1). The increase in resistivity was significantly lower than that reported previously for oxidized SWNT. Most importantly, the loss in conductivity of microwaved SWNTs was fully recovered after annealing, as evident from curve 3. The calculated bulk resistivity of the annealed SWNTs membrane is about $6\times10^{-3}$ Ω-cm. This result indicated that the microwave-induced functionalization indeed reduces electrical conductivity, which however can be recovered after high temperature annealing.

It was also observed that aqueous dispersions of microwave functionalized SWNTs were electrically conductive with an ionic conductivity in DI water of 215.8 μS relative to that of 1.5 μS for pure DI water. This raises the possibility for electrical manipulation (such as, electrodeposition of thin films) of the SWNTs from a solution phase. Another interesting observation was that the microwave functionalized SWNTs showed very low concentrations of left over iron from the starting catalyst as determined by ferromagnetic magnetic resonance (FMR) spectroscopy, which is extremely sensitive to the presence of magnetic particles. The starting HiPCO-prepared SWNTs showed a strong FMR signal indicating the presence of a significant concentration of the iron catalyst. The low residual concentration may be due to small amounts of iron, which remained trapped in the interstitial sites of the thin SWNT bundles.

For this embodiment, it can be concluded that microwave treatment of a suspension of starting SWNTs in a 1:1 mixture of 70% nitric acid and 97% sulfuric acid in water was found to form carboxylated and acid sulfonated SWNTs with relatively high dispersivity in DI water and ethanol. Elemental analysis indicated that every third and tenth carbon atoms on the SWNT structure were carboxylated and sulfonated, respectively. Some reduction in average length of the nanotubes, sidewall disordering, and extensive debundling due to functionalization, were also observed. Thermogravimetric measurements to 500° C. showed the loss of the functional groups, suggesting that structural order on the sidewalls can be restored by thermal treatment. The loss in electrical conductivity after microwave treatment can be fully recovered after high temperature annealing in argon. The results also indicate the removal of a large fraction of the iron catalyst particles during the microwave treatment. The very high dispersivity in polar solvents will enable SWNTs to be more easily processed during, for example, chemical and biochemical reactions, physical blending, and thin film/nanocomposite formation. Moreover, their alignment during deposition as a thin film from aqueous suspension will allow the fabrication of a variety of nanoscale device architectures and aligned nanocomposite structures.

Nanomaterial Substrate System

The present disclosure also provides a method for producing a nanomaterial-substrate system. In one embodiment, a method for growing nanomaterials on a substrate and attaching at least one enzyme to the nanomaterial is disclosed. The nanomaterial-substrate system may be used in a biofuel cell system or as a biosensor, for example. In one embodiment, a method for producing a nanomaterial-substrate system includes providing nanomaterial on a substrate, utilizing a catalyst deposition step to deposit catalyst/promoter precursor on the substrate, utilizing a chemical vapor deposition step, and then attaching at least one enzyme to the nanomaterial is disclosed.

In the following examples, the nanomaterials were grown using two different catalyst deposition methods, followed by ethanol chemical vapor deposition ("CVD").

In one embodiment, a method for growing individual, vertically aligned SWNTs on silicon and attaching at least one enzyme to the tube ends of the SWNTs is disclosed. In one embodiment, thin films of vertically aligned individual SWNTs were deposited on silicon using a CVD process. Oriented SWNT growth was achieved with two methods of catalyst precursor self-assembly followed by ethanol CVD. Using the silicon substrate as the working electrode in an electrochemical cell and the enzyme β-NAD (nicotinamide adenine dinucleotide) synthetase dissolved in a buffered electrolyte solution, the enzyme was attached at the nanotube ends. Enzyme immobilization on the 1 to 2 nm diameter tube ends of the individual SWNTs allows for dense packing of the enzyme and utilization of the electrode as an enzymatic sensor in a biofuel cell configuration.

Example 2

In one embodiment, bimetallic cobalt (Co): molybdenum (Mo) with 1:1 or 1.6:1 in atomic weight ratio was used as catalyst/promoter for the growth of SWNTs. The catalyst/promoter precursors were deposited by dip or spin coating techniques. The dip-coating precursor was prepared by suspending and sonicating a mixture of Co and Mo acetates in chloroform containing 0.02 wt % of metals to total solution. The dip coating process involved immersing a silicon wafer in the mixture and slowly pulling it out after 5 to 10 minutes.

The spin-coating precursor was prepared using different amounts (between 0.02 to 0.1 wt %) of metal to total solution with varying amounts of poly-vinylpyrollidone (PVP) in 90% ethanol. To prepare the catalyst/promoter precursor solution, cobalt nitrate and ammonium heptamolybdate were first dissolved in water. PVP was then added and dissolved in the clear cobalt nitrate and molybdate solution. After that, nine times of ethanol to water in volume ratio was added to the solution. The solution obtained was then spin-coated onto a Si wafer at a spinning speed of 3000 rpm. After removing the PVP polymer by heating in air to 800° C. at a heating rate of 5° C./min. and holding at 800° C. for 2 hours, the catalyst/promoter-coated substrate was transferred to the CVD system for SWNT growth.

The same SWNT growth conditions were employed for both dip- and spin-coated catalyst/promoter precursors. The CVD process involved decomposition and reduction of the catalyst/promoter precursors under flowing hydrogen (100 sccm flow rate at 1 atm.) at 800° C. followed by SWNT growth for 20 min. at the same temperature using ethanol transported by argon (300 sccm flow rate at 1 atm) as the carbon source.

Electrochemical functionalization with the enzyme, β-NAD (nicotinamide adenine dinucleotide) synthetase was carried out in a three-electrode cell, with 0.1 M of KCl used as the electrolyte. In this embodiment, the reaction was carried out in 80 ml of pH 7 phosphate buffer (40 mM) with 50 mg of the enzyme. A Si wafer with oriented SWNTs was used as the working electrode, with a platinum wire as counter electrode and a saturated calomel electrode (SCE) as reference electrode. Cyclic voltammetry (CV) was carried out at a scan rate of 50 mV/s in the range between −1V to 1V using a computer-controlled Elchema PS-205B potentiostat-galvanostat. After reaction, the SWNT electrode was rinsed with distilled water and dried in air.

The transmission electron microscope (TEM) images were obtained using a 200 kV High Resolution Transmission Electron Microscope. Scanning electron microscopy (SEM) was carried out using a LEO 1530 instrument and Raman spectroscopy using a Horiba/Jobin Yvon LabRaman system with 632.8 nm laser excitation.

Figure 10:
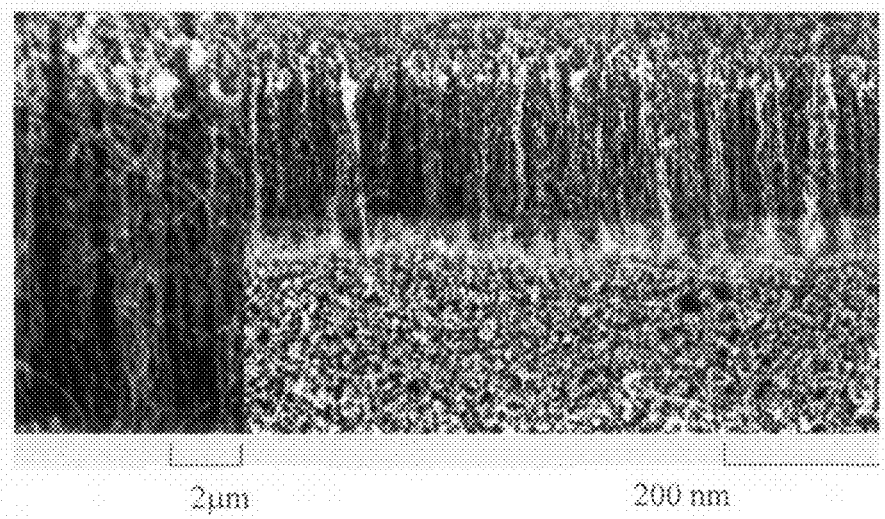
FIG. 10 depicts images of SWNTs on silicon. The top image to the right illustrates a SEM image from the edge of vertically aligned SWNT film on silicon obtained using the dip-coating method for depositing the catalyst/promoter precursors. The bottom image on the right depicts a SEM image from the top of the SWNT film with a scale bar of 2 μm. The inset picture on the bottom left is a magnified image of the aligned nanotubes with a scale bar of 200 nm.

For this embodiment, ethanol was chosen as the carbon source due to the fact that the OH radicals formed on decomposition removes amorphous carbon and thus reduces the formation of carbon soot during the growth process. 0.02 wt % each of Co and Mo in chloroform was found to be the best dip-coating catalyst/promoter precursor composition for the growth of vertically oriented SWNTs. FIG. 10 shows a typical SEM image of the oriented SWNTs obtained from the dip-coating method. The top half of the image on the right is a tilted cross-sectional view from the edge of a film, which shows the vertical alignment of the SWNTs. The bottom half of the image is from the top of the aligned SWNTs. The inset on the left of the figure is a magnified image of the aligned SWNTs.

Figure 11:
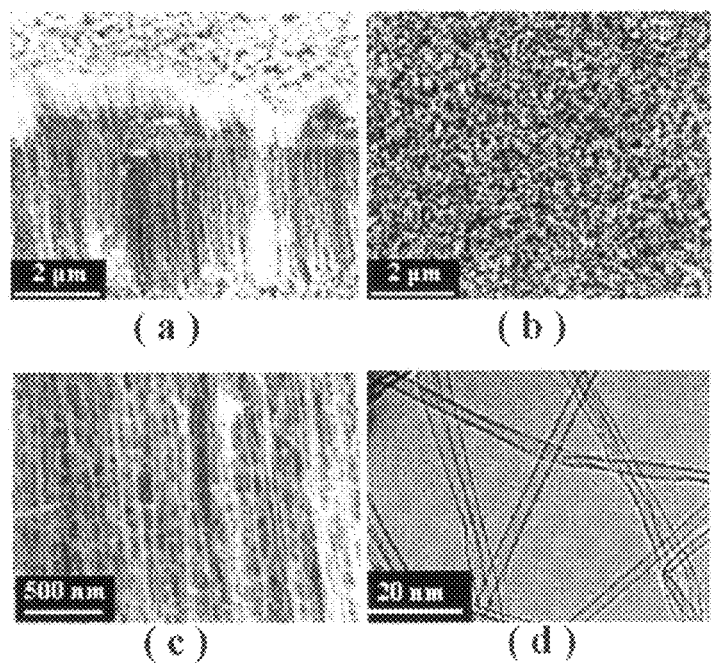
FIG. 11 depicts vertically aligned SWNTs on Si obtained from polymer (PVP) supported catalyst/promoter: (A) tilted view (about 30°) of the aligned SWNTs at an edge; (B) Top view of the vertically aligned SWNTs; (C) Magnified view of the aligned SWNTs shown in (A); and (D) TEM image taken from a sample of the aligned SWNTs.

A high degree of vertical orientation of SWNTs on Si was obtained with 0.05 wt % each of Mo and Co together with 1 wt % of PVP in 90% ethanol of catalyst/promoter precursors. FIG. 11a shows a tilted view SEM image of the vertically aligned SWNTs grown using this catalyst/promoter precursor. The image in FIG. 11b taken directly from the top of the aligned nanotubes shows densely packed SWNTs. A higher magnification SEM image of the aligned SWNTs is shown in FIG. 11c. A typical TEM image (FIG. 11d) clearly shows that a large fraction of the aligned SWNTs formed are individual tubes, rather than bundles of SWNTs that have been typically observed in previous work. Moreover, very little amorphous carbon and multiwall carbon nanotubes were found.

Figure 12:
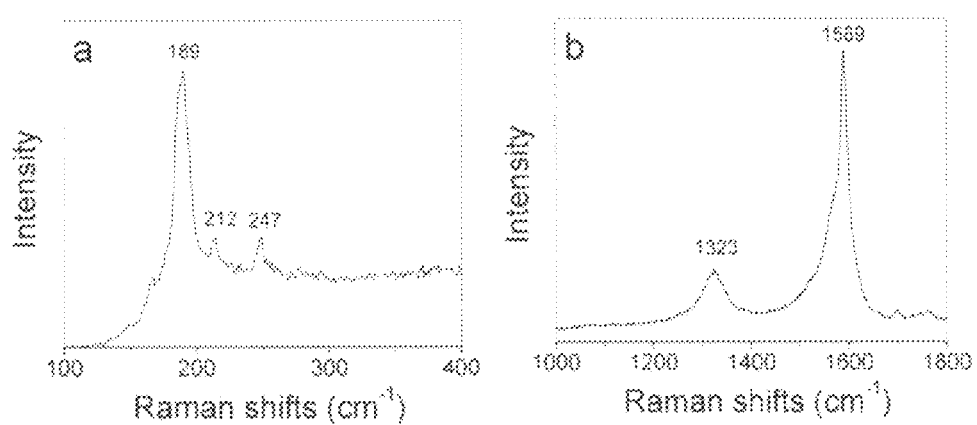
FIG. 12 depicts Raman spectrum of the vertically aligned SWNTs in the (A) radial breathing mode frequency region; and (B) defect/disorder mode and carbon-carbon tangential mode frequency region.

Raman spectra taken from the aligned SWNT samples using 632.8 nm excitation were consistent with the formation of SWNTs using both catalyst/promoter deposition methods. FIG. 12 depicts Raman spectrum of the vertically SWNTs in the (A) radial breathing mode frequency region; and (B) defect/disorder mode and carbon-carbon tangential mode frequency region. The radial breathing mode (RBM) spectrum (FIG. 12a) indicates an average SWNT diameter of 1.3 nm based on the formula: $d\ (nm)=248/\lambda$ (where $\lambda$ is the RBM Raman frequency in $cm^{-1}$ and d is the tube diameter). The average diameter is consistent with the values obtained from the TEM images. The intensity of the defect/disorder mode at $1323\ cm^{-1}$ in the high frequency region of the Raman spectrum (FIG. 12b), however, is relatively high. This is probably because the tube-ends are being more exclusively sampled in the back-scattering geometry used in these measurements.

Figure 13:
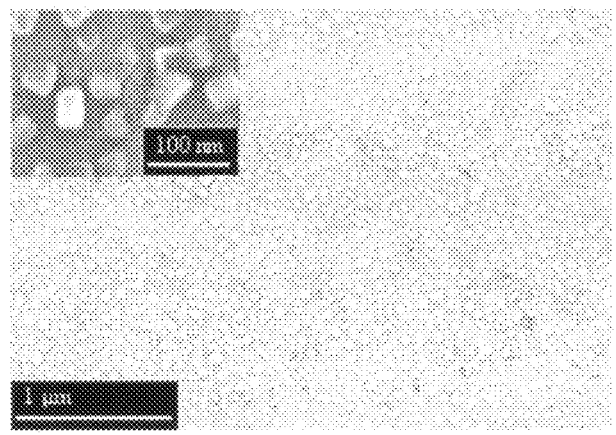
FIG. 13 is an SEM image of catalyst/promoter particles obtained from the spin coating procedure discussed in the text, after burning away the PVP polymer. The inset is a magnified image of some of the particles.

Parameters, such as, for example, catalyst/promoter particle density, size, location and reactivity are variables for the formation of well-aligned, vertically grown SWNTs. Immobilization by the polymer PVP leads to uniform, nanometer size catalyst/promoter particles (FIG. 13) which in turn results in more uniform SWNT alignment. FIG. 13 is an SEM image of catalyst/promoter particles obtained from the spin coating procedure, after burning away the PVP polymer. The inset is a magnified image of some of the particles.

Figure 14:
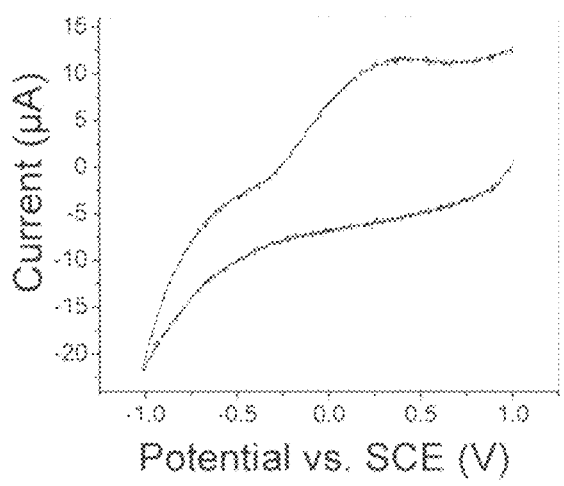
FIG. 14 depicts a cyclic voltammogram of oriented SWNT film on silicon with enzyme β-NAD synthetase in pH 7 phosphate buffer shown from a scan rate of 50 mV/s.

A Si substrate with oriented SWNTs obtained from the dip-coating catalyst/promoter was used to electrochemically react with the enzyme, β-NAD synthetase. The reaction was carried out as discussed in the experimental section for 10 scan cycles between −1 V to +1 V. The CV curve was reproducible for each scan. FIG. 14 depicts a cyclic voltammogram of oriented SWNT film on silicon with enzyme β-NAD synthetase in pH 7 phosphate buffer shown from a scan rate of 50 mV/s. As shown in FIG. 14, the CV indicates an irreversible oxidation peak at +0.39 V, which can be attributed to the oxidative attachment of the enzyme, possibly at the tube ends of the vertically aligned SWNTs.

Figure 15:
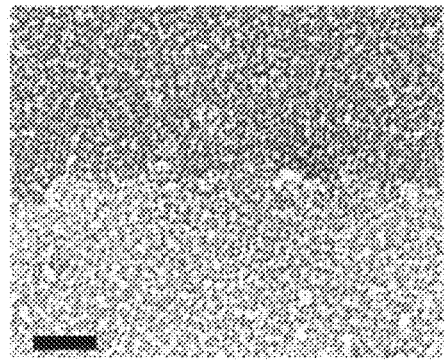
FIG. 15 are SEM images of enzyme-functionalized, oriented SWNT film on silicon: (A) SEM image showing reacted (bottom) and unreacted (top) film, and (B) Higher magnification SEM image of the enzyme reacted SWNTs showing the lighter contrast enzyme particles on top of the darker tube ends of the SWNTs. Scale bar on the left is 2 μm and that on the right is 500 nm.
Figure 15:
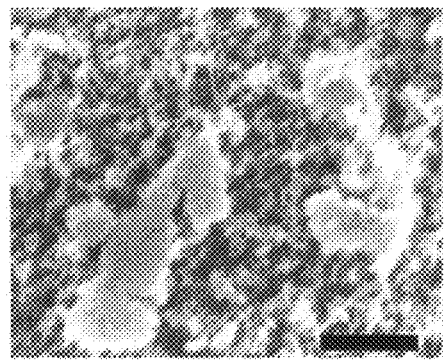

FIG. 15a shows a typical SEM image from the enzyme functionalized SWNT films. The bottom half of the image, which is lighter than the top half, is from the enzyme functionalized SWNTs. The enzyme appears to be uniformly attached to the oriented nanotube ends. However, some enzyme aggregation was also found in some spots, as shown in the higher magnification image in FIG. 15b.

The demonstration of electrochemical tethering of a FAD-based enzyme to densely packed and vertically aligned largely individual SWNTs on a silicon chip opens up the possibility of using such a platform for nanoscale biosensing—an application involving nanoscale electronics. One embodiment uses the SWNT-enzyme on silicon as an enzymatic sensing electrode in a biofuel cell configuration. An alternative embodiment uses the fabricated SWNT-enzyme platform as a working nanoelectrode in an electrochemical cell. This embodiment provides for monitoring changes in the cyclic voltammogram to detect biological agents that interact specifically with selected enzymes.

An Open, Non-Compartmentalized Biofuel Cell

In another embodiment, the present disclosure also provides for the coupling of biofuel cells with a nanomaterial, wherein the nanomaterial supports catalytic enzymes. In one embodiment, biofuel cells are coupled with nanotechnology wherein individual carbon nanotubes are used to support catalytic enzymes. This integrated biofuel cell eliminates the need for expensive electron-transfer mediators, and may also function as a biosensor.

In another embodiment, a nanotechnology biofuel cell is created by the application of microwaves to rapidly couple or bond selected enzymes to the nanotubes to give efficient fuel cell and biosensor performance. This combination facilitates non-compartmentalized biofuel cell and biosensor performance without the use of ion-exchange membranes.

In another embodiment, a nanotechnology-based biofuel cell is constructed on an electrochemically fabricated porous silicon wafer platform. This embodiment allows efficient micro- and nano-scale fluidics at low cost.

Another embodiment provides for a biofuel cell that uses specific enzymes immobilized on the molecular-scale tips of oriented single walled carbon nanotubes as electrodes. This construction permits quasi-one-dimensional ballistic conductivity of single wall carbon nanotubes in combination with their colossal molecular to nanoscale surface areas, which enhances biofuel cell performance. Additionally the high rate direct electron transfer eliminates the need for an electron mediator and concomitantly leads to enzyme stability.

In one embodiment, the open, non-compartmentalized integrated biofuel cell utilizes specific enzymes, such as, for example, GOx and BOD, immobilized and stabilized by tethering on the molecular-scale tips of SWNTs as the anode and cathode. In this embodiment, the anode could consist of, for example, GOx functionalized, oriented SWNTs on silicon and the cathode could consist of, for example, oriented SWNTs on silicon, and functionalized with BOD. These anode and cathode enzymes are immobilized and stabilized by tethering on the molecular-scale tips of SWNTs. Immobilization involves bonding the enzymes to the nanotubes.

Example 3

For this embodiment, where the anode consists of GOx functionalized, oriented SWNTs on silicon and the cathode consists of oriented SWNTs on silicon functionalized with BOD, a basic phosphate buffer was used as liquid electrolyte.

Without the addition of biofuel oxidant between the two electrodes, an observed maximum current of 40 nA (1 cm$^2$ working area) and an observed maximum open circuit voltage of 280 mV were noted. After the addition of β-D-glucose, the output increased to about 80 nA current and 480 mV open circuit voltage, indicating direct transfer fuel cell action via the aligned nanotubes. It is noteworthy that sizable fuel cell performance was achieved without the use of an electron transfer layer. A fuel cell polarization curve (not shown) for such a cell shows that about 1 micro-watt of power can be extracted from the cell comparable to that obtained from lithium iodine batteries currently in use with cardiac pacemakers. An initial demonstration of glucose detection has also been performed with the oriented SWNT/enzyme electrodes functioning as the sensing element.

Example 4

In accordance with this embodiment, the growth of SWNTs, whose individual diameters are in the 1-2 nm range within bundles or ropes, in a perpendicularly aligned manner on silicon substrates has been achieved and is shown in FIG. 10.

After applying the low power microwave method described previously, the resulting electrodes were tested in a non-compartmentalized biofuel cell shown schematically in FIG. 1 where either solid or liquid electrolytes can be used without compartmentalization. The anode consisted of the enzyme GOx functionalized, oriented nanotubes on silicon, and the cathode was comprised of oriented nanotubes functionalized with BOD enzyme, also on a silicon wafer (see FIG. 15b). When pH 7 phosphate buffer was used as the liquid electrolyte, a maximum open circuit voltage of 280 mV was detected. After addition of 100 mM β-D-glucose the output was increased to about 80 nA current and 480 mV open circuit voltage (about 60% higher than in a typical biofuel cell), indicating relatively efficient fuel cell action.

The embodiments generated as a result of the presently disclosed microwave method, illustrate the high "ballistic" conductivity of electrons within the one-dimensional structure of the nanotubes which direct the electron transfer without requiring expensive complex electron-transfer mediators.

Additionally, in one embodiment, GOx provides efficient biocatalyzed oxidation of glucose that is unaffected by oxygen, enabling the anode to operate in the presence of oxygen. Thus, in one embodiment, the biofuel cell uses $O_2$ as an oxidizer and glucose as a fuel without the need for compartmentalization.

Figure 16:
FIG. 16 depicts an optical image of a porous silicon substrate. The micron-sized channels have been shown by Raman spectroscopy to consist of nanosized inner channels.
Figure 17:
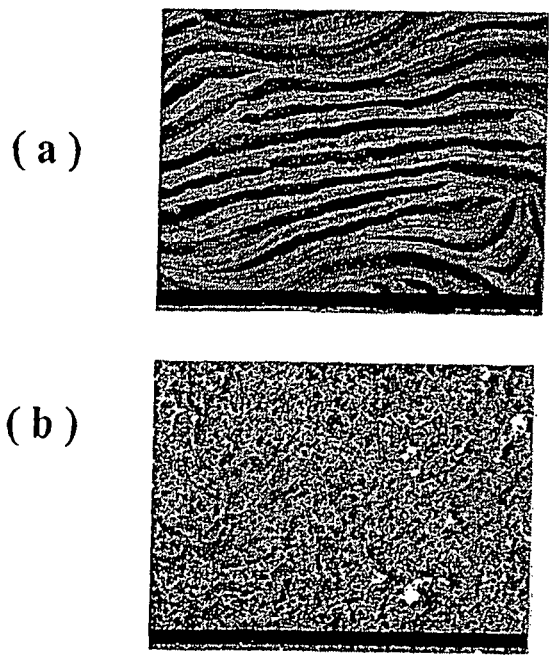
FIG. 17 depicts SEM images of: (A) micron size channels in porous silicon and (B) a SEM image of micron-sized pores in another sample of porous silicon.

In another embodiment, since the biofuel cell is non-compartmentalized, it can be used for both in vitro and ex vitro applications. For example, the biofuel cell configuration allows the construction of an in vitro electrical energy generation device utilizing glucose as fuel and $O_2$ from the blood stream as oxidizer. Such in vitro electrical energy generation devices may be power sources for implantable devices, including, but not limited to, pacemakers or insulin pumps. However, more efficiency can be achieved via the use of thin Nafion® polymer electrolyte membranes to compartmentalize the cell for ex vitro or external applications, and the use of porous silicon wafers with electrochemically etched channels (FIGS. 16 and 17). FIG. 16 depicts an optical image of a porous silicon. The micron-sized channels have been shown by spectroscopy to consist of nanosized inner channels. FIG. 17 depicts SEM images of: (A) micron size channels in porous silicon and (B) a SEM image of micron-sized pores in another sample of porous silicon.

Figure 18:
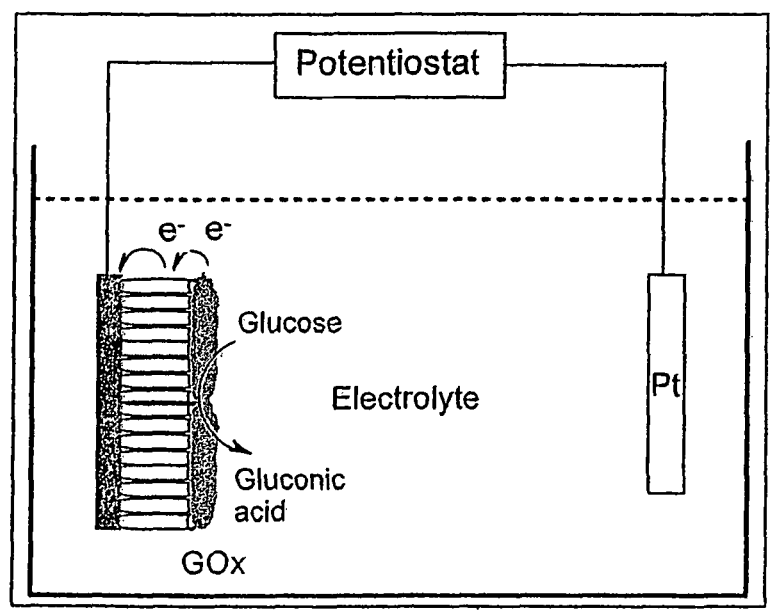
FIG. 18 depicts the schematic of another embodiment of a biofuel cell.

Another embodiment of this disclosure is the use of a biofuel cell as a biosensor. Biofuel cells can also operate as biosensors (FIG. 18) within the body. FIG. 18 depicts the schematic of another embodiment of a biofuel cell. As a biosensor, the biofuel cell can monitor the chemicals within the body that fuel the biofuel cell itself. This provides a continuously renewable, tailored power source for such items as, for example, targeted drug delivery, as well as physiological monitoring and control, such as glucose monitoring for example.

Example 5

Another embodiment provides for the fabrication and characterization of a membrane-free, direct electron transfer glucose oxidation and oxygen reduction enzymatic biofuel cell. This disclosure provides for a bioelectrode design comprised of a porous silicon ("p-Si") current collecting flow-field platform on which either single-walled or multiwalled carbon nanotubes ("SWNTs" and "MWNTs", respectively) were grown and then functionalized with carboxylic groups.

Anodic and cathodic enzymes: glucose oxidase (GOx) and laccase, respectively, were then electrochemically immobilized on the nanotube sidewalls and tips. Membrane-free biofuel cells consisting of p-Si/SWNTs or p-Si/MWNTs electrodes with immobilized GOx and laccase were studied with 4 mM glucose in pH 7 buffer solution as fuel and oxygen as oxidant.

One embodiment provides for the electrodeposition technique of directly immobilizing GOx and laccase onto the p-Si/CNT electrodes after initially acid-treating the electrodes to form carboxylic groups at the CNT tips and defects on the sidewalls. Cyclic voltammetry was used to monitor the redox reactions between the enzymes and the CNTs indicating immobilization via covalent interaction between the carboxylic group and the amine linkage on the enzyme.

Membrane-less CNT-based biofuel cells were set up and tested. Two types of cells: p-Si/SWNTs/GOx|p-Si/SWNTs/laccase and p-Si/MWNTs/GOx|p-Si/MWNTs/laccase, were assembled and their electrical characteristics were determined.

Pristine (111) n-doped silicon wafers (resistivity, ~0.005 $\Omega$-cm, ~1 cm$^2$ in area) were used to fabricate porous Si by an anodic etch in HF/ethanol 1:1 (v/v) solution. Electrochemical etching was performed by controlling the current density at 200 mA/cm$^2$ for 30 minutes. The wafers with a black porous layer were then removed and washed extensively with deionized water to remove HF.

SWNT membranes were prepared using pre-synthesized SWNTs obtained from Carbon Nanotechnologies Inc. The SWNT solids were suspended in water to which 0.5 volume % surfactant Triton X was added. The suspension was sonicated for 15 minutes and then vacuum filtered through Teflon-coated filter paper with average pore sizes of 0.1 μm. A self-assembled sheet of SWNTs was left on the filter paper, which was peeled off after drying in air.

Both single and multiwall carbon nanotubes were grown on the porous silicon wafers by chemical vapor deposition ("CVD") using ethanol as the carbon source and argon as the carrier gas at an elevated temperature of 700° C. for 10 minutes. Prior to CNT growth, catalyst cobalt and promoter (molybdenum) precursor solutions were deposited on p-Si by spin coating at 2000 rpm for 40 seconds. The solutions were prepared using 0.05 wt % and 0.075 wt % of Co [from cobalt (II) nitrate] and Mo (from heptamolybdate tetrahydrate) to 1 wt % of polyvinyl pyrollidone (PVP) in 90% ethanol. Either SWNTs or MWNTs can be formed depending on the average size of the Ni/Mo particles produced. A combination of SEM imaging and Raman spectral characterization was used to characterize the nature of the CNTs produced.

The CNTs on p-Si substrates were functionalized with carboxylic groups by sonication in concentrated $HNO_3$ for 5 minutes followed by washing with distilled water for 10 minutes at room temperature. Enzyme electrochemical immobilization reactions were performed with a computer-controlled Elchema PS 205B Potentiostat/Galvanostat system using a three electrode cell, which included the p-Si/CNTs working electrode, Pt counter electrode and a saturated calomel electrode (SCE) as the reference electrode. Cyclic voltammetry (CV) was used to demonstrate reduction-oxidation reactions. The working electrolyte solution used was 1 mg/ml of enzyme (GOx for anode and laccase for cathode for the p-Si based electrodes) in pH 7 phosphate buffer solution. The potential was swept from −1.0 V to 1.0 V and then back to −1 V.

The CNT membranes used as combined platform and electrode, were carboxyl group functionalized by sonication in nitric acid for 5 minutes followed by washing in de-ionized water for 10 minutes. GOx and Bilirubin Oxidase (BOD) enzymes were electrochemically immobilized on the membranes to form the biofuel cell anode and cathode respectively, as described for the p-Si based electrodes.

Two sets of electrodes: p-Si/MWNTs/GOx|p-Si/MWNTs/laccase and p-Si/SWNTs/GOx|p-Si/SWNTs/laccase were assembled to form membrane-less biofuel cells in order to evaluate their current-voltage and power output performance. In addition, a similar cell using a SWNT membrane was fabricated with the following configuration: SWNT membrane/GOx|SWNTmembrane/BOD. The current-voltage output of the biofuel cells were obtained at various resistive loads at a concentration of 4 mM glucose in pH 7.0 phosphate buffer with constant stirring and bubbling of air into the cell. The 1 cm by 1 cm anode and cathode electrodes were positioned 5 mm apart in the cells.

Figure 19:
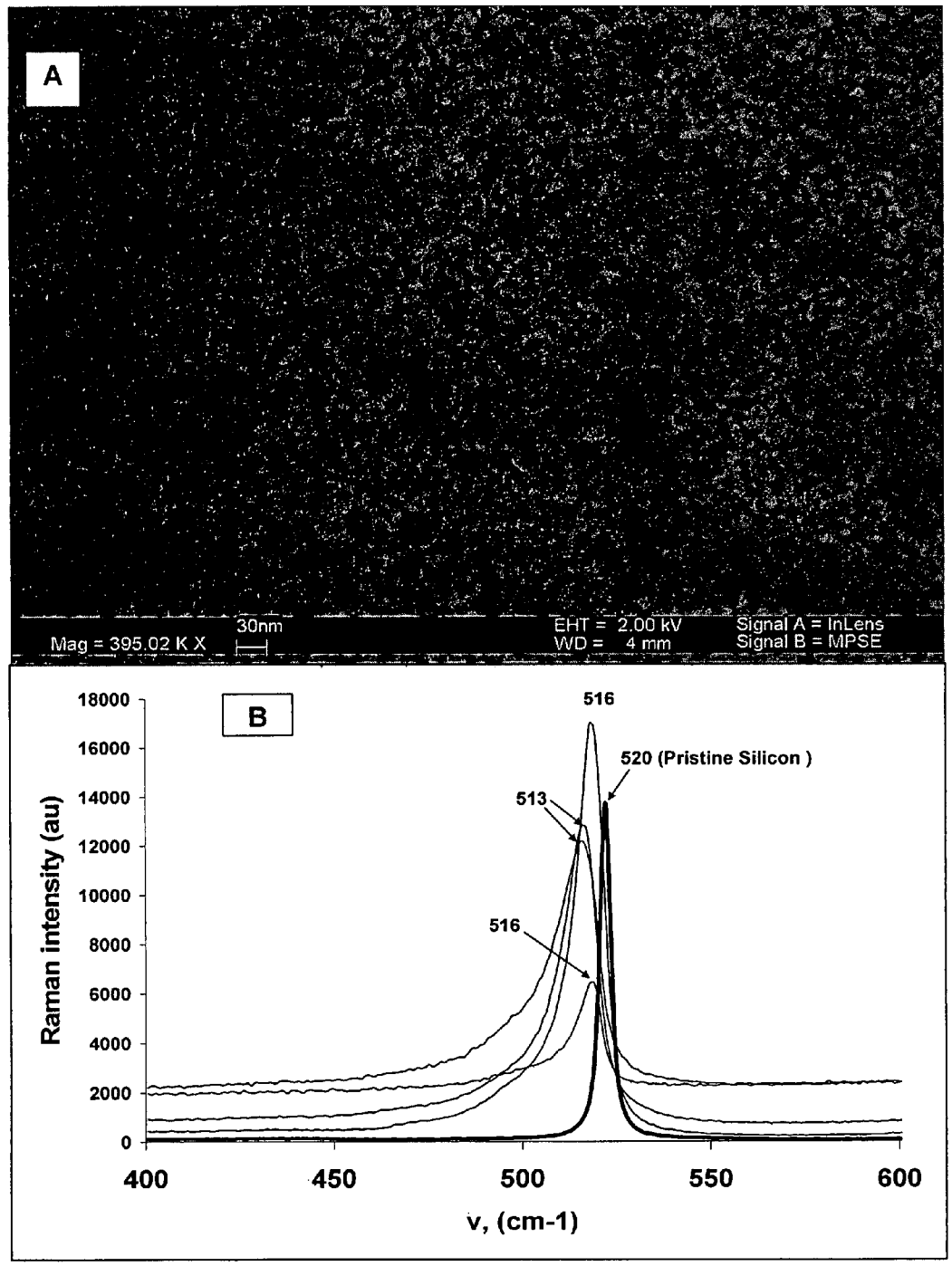
FIG. 19 depicts (A) a scanning electron microscope (SEM) image of the surface morphology of a porous silicon sample, and (B) depicts Raman spectra in the 400 to 600 $cm^{-1}$ frequency region from different parts of a porous silicon sample.

FIG. 19 depicts (A) a scanning electron microscope (SEM) image of the surface morphology of a porous silicon sample, and (B) depicts Raman spectra in the 400 to 600 cm$^{-1}$ frequency region from different parts of a porous silicon sample. FIG. 19A shows a typical scanning electron microscope (SEM) image of the surface morphology of p-Si from which pore diameters around 20 nm can be estimated. Different regions were analyzed by Raman spectroscopy and the Raman shifts shown in FIG. 19B were found to be between 513 cm$^{-1}$ to 516 cm$^{-1}$ for a majority of the porous silicon samples prepared. Silicon nanocrystallite sizes for the particles in the pores were determined to be 5 to 8 nm using the widely used calibration data of Iqbal and Veprek (Z. Iqbal, S. Veprek, J. Phys. C: Solid State Phys. 1982, 15, 377) for plasma-grown thin films of nanocrystalline silicon.

Figure 20:
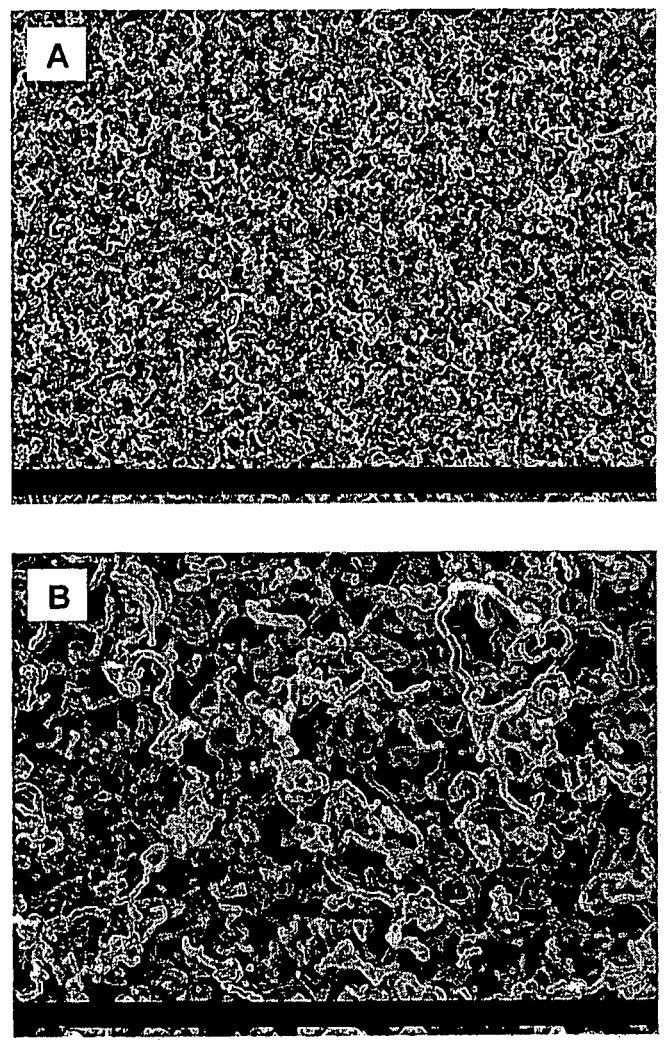
FIG. 20 depicts scanning electron microscope (SEM) images taken at (A) low and (B) high magnification of MWNTs as grown on porous silicon ("p-Si"). The scale bars are 1 μm and 200 nm, respectively.

FIG. 20 depicts scanning electron microscope (SEM) images taken at (A) low and (B) high magnification of MWNTs as grown on porous silicon ("p-Si"). The scale bars are 1 μm and 200 nm, respectively. High densities of either SWNTs or MWNTs, were obtained by using p-Si as substrate as shown by the SEM images in FIGS. 20A, 20B, 21A and 21B.

Figure 21:
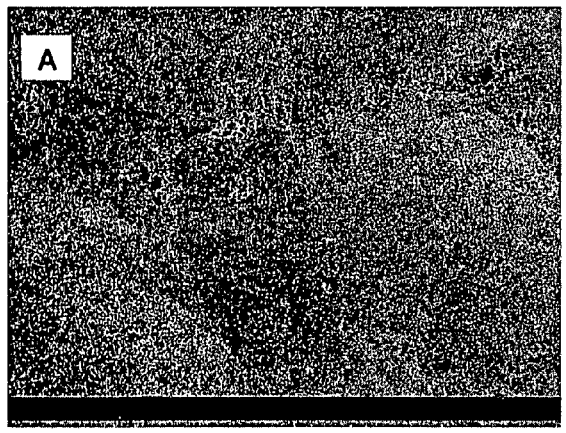
FIG. 21 depicts scanning electron microscope (SEM) images taken at (A) low and (B) high magnification of SWNTs as grown on p-Si. The scale bars are 1 μm and 100 nm, respectively.
Figure 21:
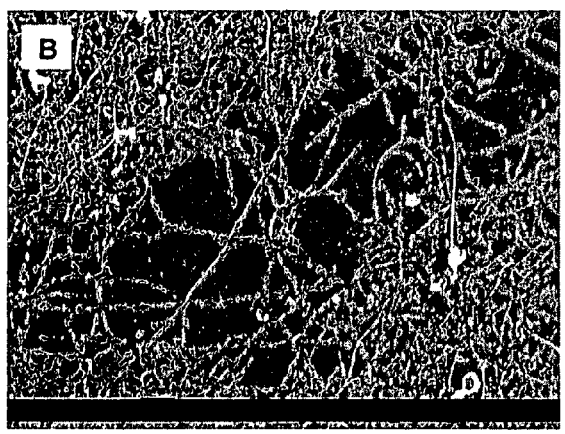
Figure 21:
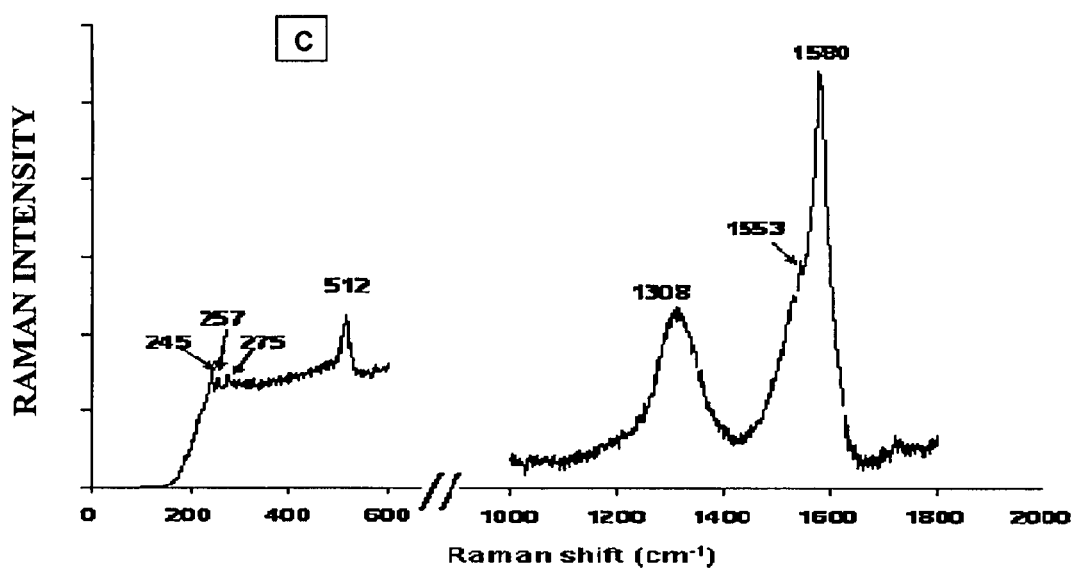

FIG. 21 depicts scanning electron microscope (SEM) images taken at (A) low and (B) high magnification of SWNTs as grown on p-Si. The scale bars are 1 μm and 100 nm, respectively. FIG. 21(C) depicts typical Raman spectrum excited using 632.8 nm radiation of SWNTs on p-Si. The Raman spectrum (FIG. 21C) taken from the SWNTs on p-Si showed the characteristic narrow G band at 1580 cm$^{-1}$ of SWNTs with a second component at 1553 cm$^{-1}$. The D mode at ~1300 cm$^{-1}$ associated with disordered carbon and/or defects and the radial breathing modes (RBM) around 150-300 cm$^{-1}$ were also observed. The average diameter of the individual SWNTs in a bundle was around 1 nm as estimated using the equation: $\alpha_{RBM}$ (cm$^{-1}$)=$\alpha$/d (nm), where $\alpha$=248 cm$^{-1}$ (R. Saito, G. Dresselhaus and M. S. Dresselhaus, Phys. Rev. 2000, 61, 2981). The line at 512 cm$^{-1}$ in FIG. 21C is the size-shifted first order silicon Raman line in porous silicon. The Raman spectra of MWNTs (not shown) are typically similar to that observed for microcrystalline carbon and cannot be used to uniquely identify these nanotubes. The presence of MWNTs can be established by careful examination of high resolution SEM images.

Figure 22:
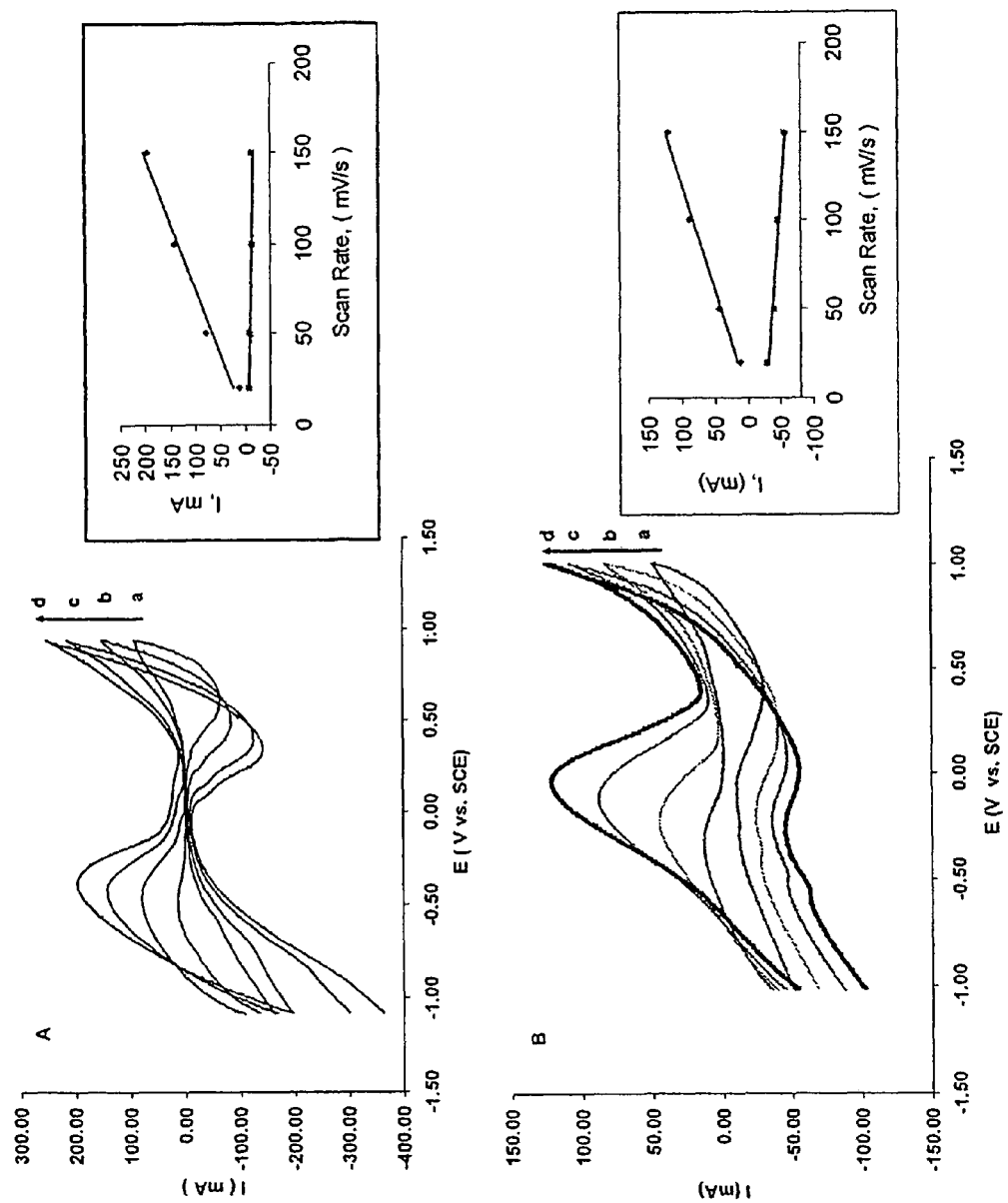
FIG. 22 depicts cyclic voltammetry data for: (A) GOx deposition and the plots (inset) of redox peak currents versus scan rate on p-Si/MWNT substrate, and (B) GOx deposition and the plots (inset) of redox peak currents versus scan rate on p-Si/SWNT substrate. Scan rates (mV/s) shown are: a. 20, b. 50, c. 100, d. 150 mV/s. P-Si/CNT substrates were immersed in 20 ml buffer solution at pH=7.0, containing 1 mg/ml GOx.

FIG. 22 depicts cyclic voltammetry data for: (A) GOx deposition and the plots (inset) of redox peak currents versus scan rate on p-Si/MWNT substrate, and (B) GOx deposition and the plots (inset) of redox peak currents versus scan rate on p-Si/SWNT substrate. Scan rates (mV/s) shown are: a. 20, b. 50, c. 100, d. 150 mV/s. P-Si/CNT substrates were immersed in 20 ml buffer solution at pH=7.0, containing 1 mg/ml GOx.

The cyclic voltammograms for GOx and laccase immobilization on both p-Si/MWNTs and p-Si/SWNTs substrates obtained according to the procedure described above showed well-defined redox peaks indicating enzyme immobilization and attachment (FIG. 22). Multiple scan rate cyclic voltammetry of p-Si/MWNT/GOx showed that the redox peak separation potential $\Delta E_p$ changed from 672 mV at 150 mV/s to 1000 mV at 20 mV/s. The observed $\Delta E_p$ values were larger than expected for a reversible one-electron reaction ($\Delta E_p$=59 mV) for both p-Si/MWNTs/GOx and p-Si/WWNTs/GOx electrodes, indicating that the process was quasi-reversible.

Figure 23:
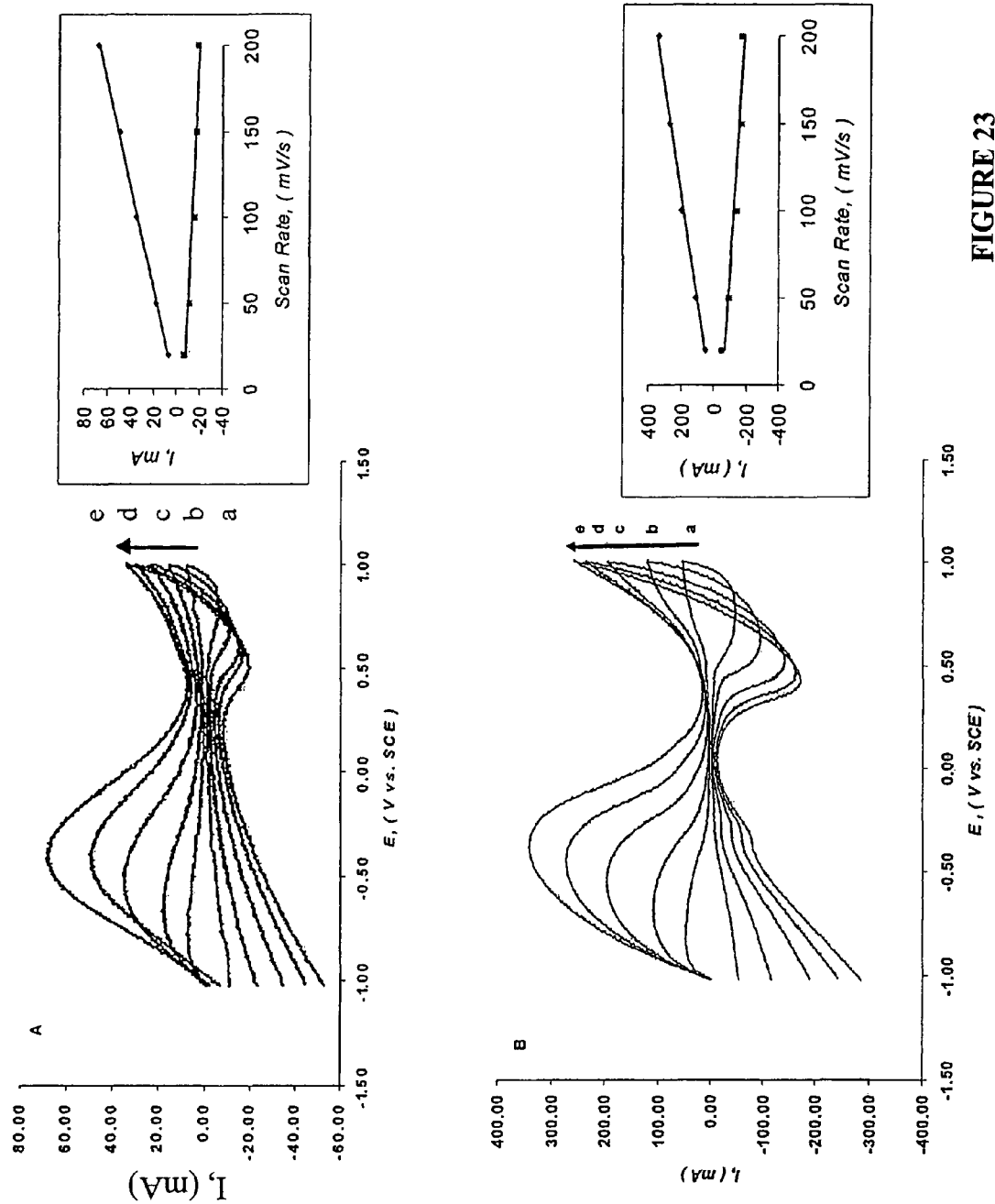
FIG. 23 depicts cyclic voltammetry data for: (A) Laccase deposition and the plots (inset) of redox peak currents versus scan rate on p-Si/MWNT substrate, and (B) Laccase deposition and the plots (inset) of redox peak currents versus scan rate on p-Si/SWNT substrate. Scan rates (mV/s) shown are: a. 20, b. 50, c. 100, d. 150 mV/s and e. 200 mV/s. P-Si/CNT substrates were immersed in 20 ml buffer solution at pH=7.0, containing 1 mg/ml laccase.

FIG. 23 depicts cyclic voltammetry data for: (A) Laccase deposition and the plots (inset) of redox peak currents versus scan rate on p-Si/MWNT substrate, and (B) Laccase deposition and the plots (inset) of redox peak currents versus scan rate on p-Si/SWNT substrate. Scan rates (mV/s) shown are: a. 20, b. 50, c. 100, d. 150 mV/s and e. 200 mV/s. P-Si/CNT substrates were immersed in 20 ml buffer solution at pH=7.0, containing 1 mg/ml laccase.

The linear relationship of the peak current with the scan rate (inserted plots in FIGS. 22 and 23) showed that the enzyme was adsorbed as a surface-confined electrode reaction. The variable scan rate CVs of the p-Si/SWNT/GOx showed $\Delta E_p$ of 20 mV at 200 mV/s, and 150 mV at 150 mV/s to 735 mV at 20 mV/s. These values were smaller than those of the p-Si/MWNT/GOx electrode.

From the CV curves for p-Si/MWNTs/laccase and p-Si/SWNTs/laccase, it can be seen that the peak currents increased along with increase of scan rate, while $\Delta E_p$ values were reduced (FIG. 23). As shown in the plots inserted in FIG. 23, the anodic and cathodic peak currents were observed to be linearly proportional up to a scan rate of 200 mV/s. The $\Delta E_p$ of p-Si/MWNTs/laccase and p-Si/SWNTs/laccase electrodes were 893 mV and 746 mV, at a scan rate of 200 mV/s, both $\Delta E_p$ values were larger than 59 mV, indicating that the systems are quasi-reversible. This observation is similar to that observed for GOx immobilization. The lower $\Delta E_p$ of p-Si/SWNTs/laccase electrodes compared to p-Si/MWNTs/laccase electrodes was also found, suggesting that the SWNT electrode has more efficient electron transfer than the MWNT electrode. This is likely to be due to the small diameter of the individual SWNTs, which are therefore more accessible to the active sites of the enzymes. Also the larger surface area of SWNTs with functional carboxylic groups would hold more enzyme molecules via amide linkages.

All the CV curves indicated the existence of direct electron transfer between the p-Si/CNT electrode/platform system and the enzymes, but the direct electron transfer rates were lower than those for the reversible reaction. The peak currents increased and shifted with increasing scan rates resulting in a large separation potential $\Delta E_p$ and asymmetry of the redox peaks in the curves, suggesting that the carboxyl-amine coupling reaction between the CNTs and enzyme occurs simultaneously with the electron transfer reaction. This may be due to the fact that chemical reaction occurs during potential sweeping resulting in slower kinetics of the electrochemical reaction. Equilibrium is therefore not established rapidly enough (in comparison to the voltage scan rate), giving rise to smaller peaks in the reverse scans. In addition, the p-Si substrate experiences a temperature of 700° C. in air for a short period during catalyst formation for CNT growth. This is likely to produce an oxide layer with poor interfacial conductivity, which would reduce the electron transport efficiency.

Figure 24:
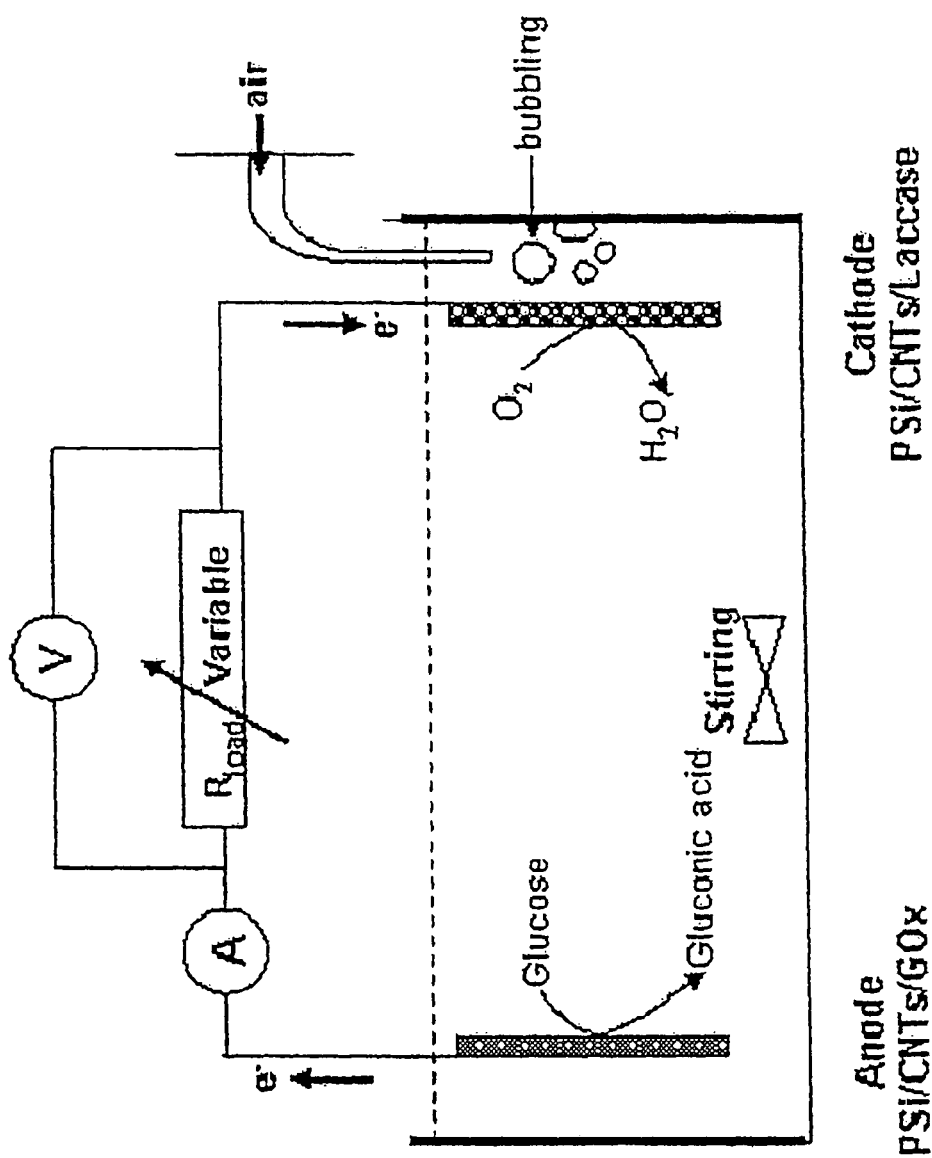
FIG. 24 depicts the schematic of one embodiment of a biofuel cell constructed employing glucose and $O_2$ as a fuel and oxidant, respectively, and p-Si/CNTs/GOx and p-Si/CNTs/laccase as anode and cathode, respectively.

The two sets of electrodes discussed above: p-Si/MWNTs/GOx|p-Si/MWNTs/laccase and p-Si/SWNTs/GOx|p-Si/SWNTs/laccase were configured as biofuel cells according to the schematic shown in FIG. 24 in order to evaluate their current-voltage and power output performance. FIG. 24 depicts the schematic of one embodiment of a biofuel cell constructed employing glucose and $O_2$ as a fuel and oxidant, respectively, and p-Si/CNTs/GOx and p-Si/CNTs/laccase as anode and cathode, respectively.

Figure 25:
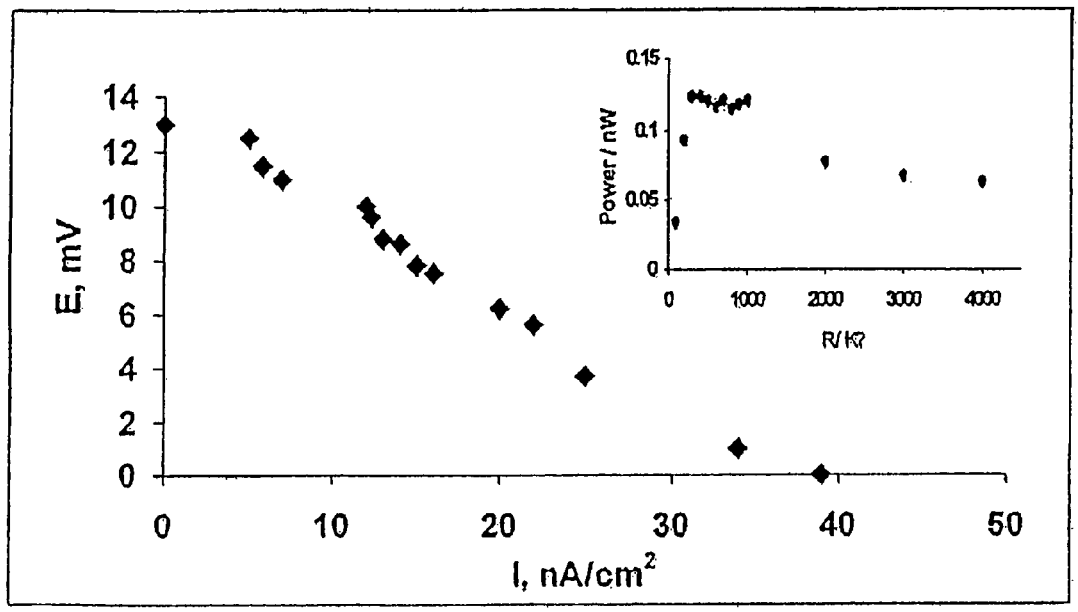
FIG. 25 depicts the current-voltage behavior of: (A): one embodiment of a p-Si/MWNTs/GOx|p-Si/MWNTs/laccase biofuel cell and (B): one embodiment of a p-Si/SWNTs/GOx|p-Si/SWNTs/laccase biofuel cell. Inserted plots are electrical power extracted from the biofuel cells at different external loads.
Figure 25:
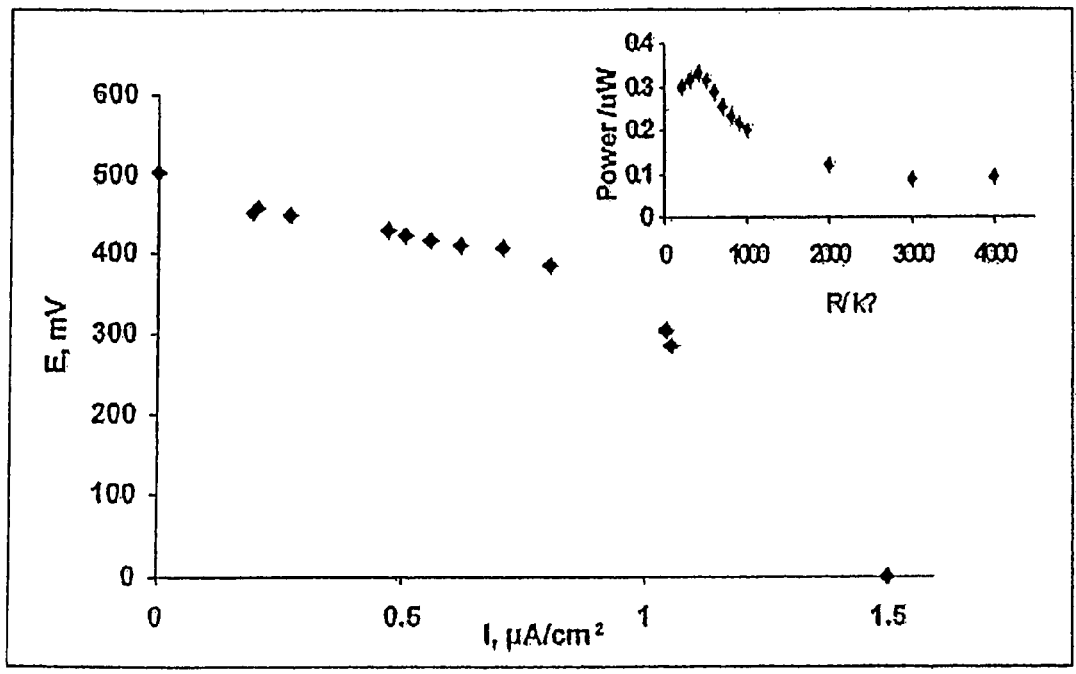

The current-voltage data for the biofuel cells at different external loads are shown in FIG. 25. FIG. 25 depicts the current-voltage behavior of: (A): one embodiment of a p-Si/MWNTs/GOx|p-Si/MWNTs/laccase biofuel cell and (B): one embodiment of a p-Si/SWNTs/GOx|p-Si/SWNTs/laccase biofuel cell. Inserted plots are electrical power extracted from the biofuel cells at different external, loads. The ideal current-voltage curve for an electrochemical power generator is expected to be rectangular. Inspection of the current-voltage curves in FIG. 25 shows that the p-Si/MWNTs/GOx|p-Si/MWNTs/laccase biofuel cell deviates significantly from ideal behavior, whereas the current-voltage plot for the p-Si/SWNTs/GOx|p-Si/SWNTs/laccase biofuel cell trended towards a rectangular shape.

The extractable power from the biofuel cell ($P=V_{cell}I_{cell}$) is controlled by the cell voltage ($V_{cell}$) and cell current ($I_{cell}$). The power (P) from the biofuel cells for different external loads is shown in FIG. 25 (inserted plots). The maximum power extracted is 0.124 nW for the p-Si/MWNTs/GOx|p-Si/MWNTs/laccase biofuel cell at an external load of 400 k$\Omega$ with potential of 6.2 mV, and 0.35 µW for p-Si/SWNTs/GOx|p-Si/SWNTs/laccase biofuel cell at an external load of 400 k$\Omega$ with potential of 357 mV, indicating that the power extracted from the SWNT-based cell is over three orders of magnitude better than that for the MWNT-based biofuel cell. The fill factor, $f=P_{max}I_{sc}^{-1}v_{oc}^{-1}$, corresponds to ca. 26% and 44% for p-Si/MWNTs/GOx|p-Si/MWNTs/laccase and p-Si/SWNTs/GOx|p-Si/SWNTs/laccase biofuel cells, respectively.

The present disclosure provides for the fabrication of direct electron transfer GOx and laccase-based biocatalysts on p-Si/CNT substrates using a direct electrochemical immobilization and attachment technique. Both directly grown SWNTs and MWNTs were used as direct electron transfer mediators. The cyclic voltammetry data showed that the p-Si/SWNT electrode provided better electron transfer efficiency compared to the p-Si/MWNT electrode. The method presented here can be extended to immobilize and electrochemically attach other enzymes. Membrane-less biofuel cells for two sets of electrodes: p-Si/MWNTs/GOx|p-Si/MWNTs/laccase and p-Si/SWNTs/GOx|p-Si/SWNTs/laccase were assembled and their performance was investigated. The electrical power generated by the p-Si/SWNTs/GOx|p-Si/SWNTs/laccase biofuel was higher than that of the p-Si/MWNTs/GOx|p-Si/MWNTs/laccase biofuel cell by three orders of magnitude.

Figure 26:
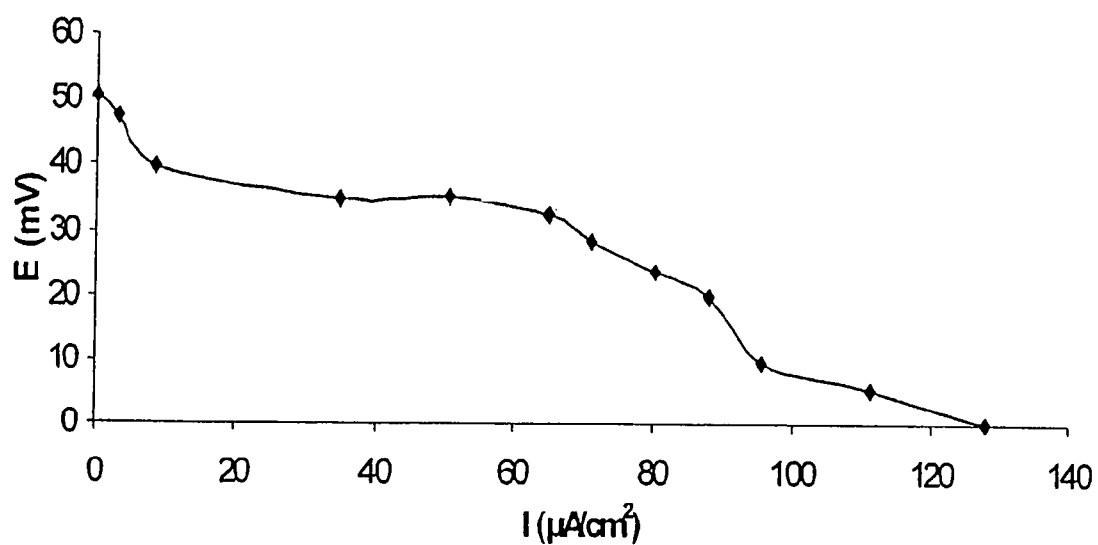
FIG. 26 depicts the current-voltage behavior of one embodiment of a SWNTmembrane/GOx|SWNTmembrane/BOD biofuel cell.

In another embodiment, a SWNT membrane/GOx|SWNTmembrane/BOD biofuel cell using a highly conducting SWNT membrane functioning both as electrode and platform was constructed. The current-voltage behavior of such a cell is shown in FIG. 26 from which a power output of 2.2 µW at 30 mV was extracted. FIG. 26 depicts the current-voltage behavior of one embodiment of a SWNTmembrane/GOx|SWNTmembrane/BOD biofuel cell.

There are many advantageous properties and/or characteristics of the present disclosure. The advantageous properties and/or characteristics of the present disclosure include, but are not limited to the following. It should be noted that not every embodiment of the present disclosure contains all of the properties and/or characteristics listed below:

One advantage of the present disclosure is that biological fuel cells are engineered on a molecular scale. These biofuel cells are small and light weight because they convert the fuel and oxidants to benign byproducts with the generation of electricity, and they use concentrated sources of chemical energy from the blood stream, as opposed to battery powered devices.

In addition, biofuel cells provide a continuously renewable, tailored power source because the biological fuel cells are fueled by chemicals within the body itself. Accordingly, the biofuel cells can operate for long durations without the need for maintenance requiring surgical procedures, as are currently required with battery operated technologies, which is increasingly important with the trend towards the use of implantable electrical devices. An example of how this can be achieved is in an open, non-compartmentalized integrated biofuel cell that utilizes specific enzymes, such as GOx and BOD, immobilized and stabilized by tethering on the molecular-scale tips of SWNTs as the anode and cathode.

Another advantage is that the biofuel cell is non-compartmentalized. For example, this biofuel cell configuration allows the construction of an in vitro electrical energy generation device utilizing glucose as fuel and $O_2$ from the blood stream as oxidizer. Such in vitro electrical energy generation devices may be power sources for implantable devices, including, but not limited to, pacemakers or insulin pumps. This biofuel cell configuration also permits ex vitro or external applications. For example, the biofuel cell efficiency can for ex vitro or external applications be achieved via the use of thin Nafion polymer electrolyte membranes to compartmentalize the cell and the use of porous silicon wafers with electrochemically etched channels.

Another advantage stems from the molecular scale and non-compartmentalized nature of the biofuel cell, which allows for versatility of use in a range of applications including, but not limited to: targeted drug delivery, physiological monitoring and control, synthetic organs, prostheses, and other advanced medical device concepts. Examples of the latter include, but is not limited to, pacemakers, insulin pumps, glucose and pressure sensors, and bionic devices for stimulating the brain and spinal cord. Biofuel cells could also power external devices attached to the skin, such as, for example, patches and intravenous devices for drug delivery.

Another advantage is a reduction of cost. An embodiment of the present disclosure provides a high "ballistic" conductivity of electrons within the one-dimensional structure of the nanotubes. This directs the electron transfer without requiring expensive and complex electron-transfer mediators. Previous fuel cells used expensive noble metals as catalysts, for example, platinum and ruthenium or the like. However, the presently disclosed biofuel cell uses biocatalysts such as, for example, enzymes, or even whole organisms, to catalyze the conversion of chemical energy into electricity.

Another advantage is that the biofuel cells typically operate at temperatures compatible with living organisms. Unlike battery powered devices which can harm surrounding tissues by resultant temperature increases, typically biofuel cells are compatible for use in living biological entities without harming tissues from the biofuel cell's operation.

High energy efficiency and stability are additional advantages of the presently disclosed enzymatic biofuel cells. An embodiment of the disclosed biofuel cell has efficient micro- and nano-scale fluidics due to the micro-channels. Additionally there is no cross-over of fuel across a polymer electrolyte membrane because in non-compartmentalized operation oxidation and reduction will be permitted to occur only on the anode and cathode, respectively. Also, the use of carbon nanotubes on which the enzymes are attached enable the enzymes to be more hardy and less fragile because the carbon nanotubes do not chemically interfere with immobilized enzymes as occurs with methods currently known in the art that use Nafion® membrane, thereby ensuring longer enzyme life. Accordingly this provides for higher power densities combined with extended lifetimes.

Nanomaterials and SWNTs have a more preferable alignment during deposition from solution due to the presently disclosed method. Carbon nanotubes maintain a specific geometry, cultivated on a silicon electrode platform as opposed to free-floating suspension. This geometry and alignment eases the complexity of the enzymes, while still retaining their chemical properties. Using carbon nanotubes with a specific geometry also makes access to the reaction centers within these enzymes simpler thereby facilitating and improving performance of the biofuel cell.

An embodiment of the presently disclosed biofuel cell also has the advantage of improved fluidics due to the use of the porous silicon base with nano-sized channels.

Enhanced applicability of carbon nanotubes in various applications is another advantage that arises from the functionalization of the carbon nanotubes. Since carbon nanotubes are naturally inert and do not mix and blend easily in most matrices, functionalization allows modification thereby increasing the uses of previously inert entities. Functionalization may also lead to more efficient purification/separation techniques, such as, for example, those based on chirality, or, the separation of metallic SWNTs from semi-conducting ones. More importantly, functionalization leads to the development of new classes of material with specificity for different physical and chemical properties.

Ease of processing is an advantage directly related to solubility, in both water and organic solvents, which results from the functionalization of the carbon nanotubes.

Rapid functionalization is another advantage. When practicing one of the disclosed methods of synthesis, the microwave-induced reaction occurs in a matter of seconds or minutes and can generate a high purity product with high, yield. This is advantageous because it makes the overall process cost effective. The reaction speed is partially due to rapid heating and even superheating at a molecular level. Side reactions are also eliminated as the bulk does not need to be heated.

Another advantage of an embodiment of the presently disclosed method of synthesis is that it induces a relatively low temperature microwave-induced reaction to soluble nanomaterials. The presently disclosed method of synthesis has the ability to operate at a low temperature, due in part to in-situ heating at the reaction site. This is advantageous because it leads to fast reaction kinetics and reactions that would not otherwise be possible.

The microwave process also provides the added benefit of being able to allow carbon nanotubes to immobilize enzymes quickly without the use of membranes which increases the efficiency of the biofuel cell and biosensor performance.

Microwave induced reactions as a means of nanotube functionalization and water-dispersion are also important from the standpoint of process development and scale-up. The ease of creating functionalized soluble nanomaterials increases production of nanomaterials at a reduced price, thereby enabling sufficient quantities to be produced for use in commercial goods as well as production at a cost that can be tolerated by consumer markets. Additionally the method in general reduces reaction time by orders of magnitude and provides high yield, thus adding to its cost effectiveness.

Another advantage to this method is that the synthesis, production and use are environmentally safer as it requires less energy and chemicals such as solvents. Specifically, the microwave process reduces the need for solvents.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

What is claimed:

1. A biofuel cell system comprising:
an anode electrically coupled to a cathode; and
an electrolyte in electrical communication with the anode and the cathode;
wherein the anode includes a first microwave functionalized carbon nanomaterial on a first substrate, the first microwave functionalized carbon nanomaterial on the first substrate having at least one first enzyme directly immobilized by the first microwave functionalized carbon nanomaterial;
wherein the cathode includes a second microwave functionalized carbon nanomaterial on a second substrate, the second microwave functionalized carbon nanomaterial on the second substrate having at least one second enzyme directly immobilized by the second microwave functionalized carbon nanomaterial;
wherein the first microwave functionalized carbon nanomaterial enables direct electron transfer between the first substrate and the at least one first enzyme without a need for an additional electron transfer layer or electron-transfer mediator in the anode;
wherein the second microwave functionalized carbon nanomaterial enables direct electron transfer between the second substrate and the at least one second enzyme without a need for an additional electron transfer layer or electron-transfer mediator in the cathode;
wherein the at least one first enzyme is microwave bonded to the first microwave functionalized carbon nanomaterial thereby immobilizing the at least one first enzyme via direct covalent bonding interaction between the first microwave functionalized carbon nanomaterial and the at least one first enzyme; and
wherein the at least one second enzyme is microwave bonded to the second microwave functionalized carbon nanomaterial thereby immobilizing the at least one second enzyme via direct covalent bonding interaction between the second microwave functionalized carbon nanomaterial and the at least one second enzyme.

2. The biofuel cell system of claim 1, wherein the at least one first enzyme includes glucose oxidase (GOx).

3. The biofuel cell system of claim 2, wherein the electrolyte includes 100 mM β-D-glucose in pH 7 phosphate buffer.

4. The biofuel cell system of claim 1, wherein the at least one second enzyme includes one of (i) bilirubin oxidase (BOD) and (ii) laccase.

5. The biofuel cell system of claim 1, further comprising a porous polymer, and wherein the electrolyte is immobilized in the pores of the porous polymer.

6. The biofuel cell system of claim 5, wherein the porous polymer is poly-tetrafluoroethylene (PTFE).

7. The biofuel cell system of claim 5, wherein the biofuel cell system is utilized as an implanted device.

8. The biofuel cell system of claim 1, further comprising a bio-compatible polymer, wherein the bio-compatible polymer encompasses the biofuel cell system.

9. The biofuel cell system of claim 8, wherein the biofuel cell system is utilized as an implanted device.

10. The biofuel cell system of claim 1, wherein at least one of the first and second carbon nanomaterial is selected from the group consisting of single wall carbon nanotubes (SWNTs), multiwall carbon nanotubes (MWNTs), carbon nanohorns, fullerenes, carbon nano onions, carbon nanocomposites and combinations thereof.

11. The biofuel cell system of claim 1, wherein the first and second substrates are silicon.

12. The biofuel cell system of claim 1, wherein the first and second substrates are porous silicon.

13. The biofuel cell system of claim 1, wherein the first and second substrates are polymeric substrates.

14. The biofuel cell system of claim 1, wherein the first and second substrates are carbon nanotube membranes.

15. The biofuel cell system of claim 1, wherein the first and second carbon nanomaterials are vertically oriented on the first and second substrates.

16. The biofuel cell system of claim 1, wherein the first carbon nanomaterial includes a first plurality of carbon nanotubes, each carbon nanotube of the first plurality of carbon nanotubes having a fullerene $C_{60}$ molecule chemically tethered thereto, and
wherein the second carbon nanomaterial includes a second plurality of carbon nanotubes, each carbon nanotube of the second plurality of carbon nanotubes having a fullerene $C_{60}$ molecule chemically tethered thereto.

17. The biofuel cell system of claim 1, wherein at least one micro-fluidic channel located on the first substrate suctionally communicates with the first microwave functionalized carbon nanomaterial; and
wherein at least one micro-fluidic channel located on the second substrate suctionally communicates with the second microwave functionalized carbon nanomaterial.

18. The biofuel cell system of claim 1, wherein the first microwave functionalized carbon nanomaterials are a first plurality of fullerenes; and
wherein the second microwave functionalized carbon nanomaterials are a second plurality of fullerenes.

19. The biofuel cell system of claim 1, wherein the first and second microwave functionalized carbon nanomaterials are functionalized with carboxylic groups.

20. The biofuel cell system of claim 19, wherein the at least one first enzyme is immobilized by covalent interaction between the carboxylic groups of the first microwave functionalized carbon nanomaterial and the at least one first enzyme; and
wherein the at least one second enzyme is immobilized by covalent interaction between the carboxylic groups of the second microwave functionalized carbon nanomaterial and the at least one second enzyme.

21. The biofuel cell system of claim 1, wherein the at least one first enzyme is immobilized by covalent interaction between the first microwave functionalized carbon nanomaterial and amine groups on the at least one first enzyme; and
wherein the at least one second enzyme is immobilized by covalent interaction between the second microwave functionalized carbon nanomaterial and amine groups on the at least one second enzyme.

22. The biofuel cell system of claim 1, wherein the at least one first enzyme is attached to ends of the first microwave functionalized carbon nanomaterial distal with respect to the first substrate; and wherein the at least one second enzyme is attached to ends of the second microwave functionalized carbon nanomaterial distal with respect to the second substrate.

23. The biofuel cell system of claim 1, wherein the first and second microwave functionalized carbon nanomaterials are functionalized with sulfonic groups.

24. The biofuel cell system of claim 23, wherein the at least one first enzyme is immobilized by covalent interaction between the sulfonic groups of the first microwave functionalized carbon nanomaterial and the at least one first enzyme; and
wherein the at least one second enzyme is immobilized by covalent interaction between the sulfonic groups of the second microwave functionalized carbon nanomaterial and the at least one second enzyme.

25. An electrode comprising:
a microwave functionalized carbon nanomaterial coupled directly to a substrate, and at least one enzyme directly immobilized by the microwave functionalized carbon nanomaterial;
wherein the microwave functionalized carbon nanomaterial enables direct electron transfer between the substrate and the at least one enzyme without a need for an additional electron transfer layer or electron-transfer mediator; and
wherein the at least one enzyme is microwave bonded to the microwave functionalized carbon nanomaterial thereby immobilizing the at least one enzyme via direct covalent bonding interaction between the microwave functionalized carbon nanomaterial and the at least one enzyme.

26. The electrode of claim 25, wherein the at least one enzyme includes β-NAD (nicotinamide adenine dinucleotide) synthetase.

27. The electrode of claim 25, wherein the carbon nanomaterial is selected from the group consisting of single wall carbon nanotubes (SWNTs), multiwall carbon nanotubes (MWNTs), carbon nanohorns, fullerenes, carbon nano onions, carbon nanocomposites and combinations thereof.

28. The electrode of claim 25, wherein the electrode is included as a nanoelectrode in an electrochemical cell.

29. The electrode of claim 25, wherein the electrode is included as a biosensor in a biofuel cell.

30. The electrode of claim 25, wherein the substrate is silicon.

31. The electrode of claim 25, wherein the substrate is porous silicon.

32. The electrode of claim 25, wherein the substrate is polymeric substrates.

33. The electrode of claim 25, wherein the substrate is carbon nanotube membranes.

34. The electrode of claim 25, wherein the microwave functionalized carbon nanomaterial is vertically oriented on the substrate.

35. The electrode of claim 25, wherein the microwave functionalized carbon nanomaterial includes a plurality of carbon nanotubes, each carbon nanotube of the plurality of carbon nanotubes having a fullerene $C_{60}$ molecule chemically tethered thereto.

36. The electrode of claim 25, wherein the microwave functionalized carbon nanomaterial is a plurality of fullerenes.

37. The electrode of claim 25, wherein at least one micro-fluidic channel is located on the substrate, wherein the at least one micro-fluidic channel suctionally communicates with the microwave functionalized carbon nanomaterial.

38. The electrode of claim 25, wherein the microwave functionalized carbon nanomaterial is functionalized with carboxylic groups.

39. The electrode of claim 38, wherein the at least one enzyme is immobilized by covalent interaction between the carboxylic groups of the microwave functionalized carbon nanomaterial and the at least one enzyme.

40. The electrode of claim 25, wherein the at least one enzyme is immobilized by covalent interaction between the microwave functionalized carbon nanomaterial and amine groups on the at least one enzyme.

41. The electrode of claim 25, wherein the at least one enzyme is attached to ends of the microwave functionalized carbon nanomaterial distal with respect to the substrate.

42. The electrode of claim 25, wherein the microwave functionalized carbon nanomaterial is functionalized with sulfonic groups.

43. The electrode of claim 42, wherein the at least one enzyme is immobilized by covalent interaction between the sulfonic groups of the microwave functionalized carbon nanomaterial and the at least one enzyme.

44. A method for producing the electrode of claim 25, the method comprising:
coupling the carbon nanomaterial directly to the substrate via a chemical vapor deposition ("CVD") process; and
bonding the at least one enzyme directly to the carbon nanomaterial thereby immobilizing the at least one enzyme.

45. The method of claim 44, wherein the CVD process includes utilizing a catalyst deposition step to deposit a catalyst/promoter precursor on the substrate, wherein the catalyst/promoter precursor is deposited on the substrate utilizing at least one of: (i) a dip coating technique and (ii) a spin coating technique.

46. The method of claim 44, wherein the CVD process includes ethanol chemical vapor deposition.

47. A method for utilizing the electrode of claim 25, the method comprising adapting the electrode for use as a biosensor and utilizing the electrode to detect an analyte.

48. The method of claim 47, wherein the electrode is adapted for use as a biosensor in a biofuel cell, wherein the analyte is a chemical constituent of the biofuel cell.

49. The method of claim 47, wherein the at least one enzyme includes glucose oxidase (GOx), and wherein the analyte is glucose.

* * * * *